(12) United States Patent
Ueoka et al.

(10) Patent No.: US 7,769,721 B2
(45) Date of Patent: Aug. 3, 2010

(54) DATA RECOVERY METHOD IN DIFFERENTIAL REMOTE BACKUP FOR A NAS SYSTEM

(75) Inventors: Atsushi Ueoka, Machida (JP); Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 374 days.

(21) Appl. No.: 12/017,685

(22) Filed: Jan. 22, 2008

(65) Prior Publication Data
US 2009/0077134 A1 Mar. 19, 2009

(30) Foreign Application Priority Data
Sep. 13, 2007 (JP) ............... 2007-237942

(51) Int. Cl.
G06F 17/30 (2006.01)
G06F 7/00 (2006.01)

(52) U.S. Cl. ...................................... 707/679
(58) Field of Classification Search .................. 707/204, 707/10
See application file for complete search history.

(56) References Cited

U.S. PATENT DOCUMENTS

2003/0229651 A1* 12/2003 Mizuno et al. .............. 707/200
2005/0091448 A1 4/2005 Nakatani et al.
2006/0218135 A1* 9/2006 Bisson et al. ................... 707/4
2006/0259725 A1 11/2006 Saika et al.

FOREIGN PATENT DOCUMENTS

JP 2005-128861 5/2005
JP 2005-292952 10/2005

* cited by examiner

Primary Examiner—Kuen S Lu
(74) Attorney, Agent, or Firm—Brundidge & Stanger, P.C.

(57) ABSTRACT

To ensure the consistency of data included in blocks which have already been received and has already been remote-copied, on a file basis, in a destination NAS system, when remote copy has failed due to a failure which has occurred in a source NAS system, there is provided a method in which: a source NAS system transmits a correspondence between an updated block and a file, to a destination NAS system when remote copy is started; the destination NAS system records a remote copy state for each block; a management server refers to the information recorded by the destination NAS system and selects files from which all the update blocks have been received, when remote copy has failed due to a failure which has occurred in the source NAS system; and the destination NAS system stores data included in the update blocks of the files selected by the management server.

15 Claims, 15 Drawing Sheets

| FILE NAME | P-VOL BLOCK | D-VOL BLOCK 1 | D-VOL BLOCK 2 | ... | COMPLETION FLAG |
|---|---|---|---|---|---|
| File 1 | P1 | D1 | D5 | ... | 1 |
|  | P2 | - | D6 | ... | 1 |
| File 2 | P3 | D2 | - | ... | - |
|  | P4 | D3 | D7 | ... | 1 |
| File 3 | P5 | D4 | D8 | ... | 0 |
|  | P2 | - | D6 | ... | 1 |

*FIG. 8*

| FILE NAME | BLOCK ID |
|---|---|
| File1 | P1 |
|  | P2 |
|  | P6 |
| File2 | P3 |
|  | P4 |
|  | P7 |
| File3 | P5 |
|  | P2 |
|  | P8 |

*FIG. 9*

| FILE NAME | UPDATE DATE AND TIME | UPDATE USER |
|---|---|---|
| File1 | 2007/07/16 08:40 | User 1 |
| File2 | 2007/07/16 08:43 | User 1 |
| File3 | 2007/07/16 09:30 | User 2 |
| File4 | 2007/07/16 09:33 | User 1 |

DATA RECOVERY METHOD IN DIFFERENTIAL REMOTE BACKUP FOR A NAS SYSTEM

CLAIM OF PRIORITY

The present application claims priority from Japanese application P2007-237942 filed on Sep. 13, 2007, the content of which is hereby incorporated by reference into this application.

BACKGROUND OF THE INVENTION

This invention relates to a remote copy method of transferring data on a block basis of a storage system between NAS systems.

In a storage system represented by a disk array, a storage area in a disk drive in the storage system is logically partitioned to be provided to a host computer as a volume. The storage system is connected to a network, and the host computer connects to the storage system through the network to use the volume. There is known a network attached storage (NAS) system as an example of the storage system for providing a volume through a network as described above. In the NAS system, an operating system or a file system operates to execute a file I/O in response to a request from a NAS client (host computer) with respect to files stored in each volume.

As regards the NAS system described above, there has been disclosed a method of conducting remote copy between NAS systems by using data in an updated block of a volume storing files and differential data between snapshots of the volume (JP 2005-292952 A).

Also, there has been disclosed a method used for conducting remote copy between NAS systems, in which contents of update of a file in a source NAS system and a management information record of the file are received by a destination NAS system and stored in a volume, and the destination NAS system updates management information of the file stored in a cache memory with reference to the management information record of the file which has been stored in the volume (JP 2005-128861 A). According to this conventional example, when data is updated at a local site, contents of the update are copied in real time to a file system at a remote site, to thereby make latest file data available for reference.

SUMMARY OF THE INVENTION

According to the method disclosed in JP 2005-292952 A, in a case where a failure has occurred in a NAS system in operation, it is possible to restore a volume of the NAS system in which the failure has occurred or to continue the operation in a remote copy destination NAS system, by using data stored in a volume of the remote copy destination NAS system.

However, according to JP 2005-292952 A, processing of data is performed on a block basis, and therefore, no consideration is given as to which file the update data or the differential data to be remote-copied belongs to. As a result, in a case where a failure has occurred in a NAS system in operation during remote copy processing, the remote copy destination NAS system cannot determine whether update data and differential data of a certain file have all been received or not, and therefore the remote copy destination NAS system cannot copy the update data and the differential data, which have been received through the remote copy processing in progress, to the volume thereof. Accordingly, none of the contents of data which have been updated in the NAS system in operation since the last remote copy until the failed remote copy are copied to the remote copy destination NAS system. For this reason, it is necessary to perform again all the file operations which have been performed since the last remote copy until the failed remote copy, after the data in the NAS system in operation has been restored by using the data in the remote copy destination NAS system, or after the operation has been resumed in the remote copy destination NAS system.

Also, according to the method disclosed in JP 2005-128861 A, the file management information on the cache memory of the remote copy destination NAS system corresponds to the contents of a file at a point in time when the remote copy has been completed, to thereby make the latest file data constantly available for reference by the remote copy destination NAS system.

However, remote copy is conducted to the remote copy destination NAS system every time when a file in the remote copy source NAS system is updated. In other words, the remote copy is conducted on a file basis. Meanwhile, in a case where a plurality of files is updated through one transaction, the plurality of files also need to be updated in the remote copy destination NAS system so as to correspond to the contents updated through the one transaction. Accordingly, in the case where a failure has occurred in the NAS system in operation during remote copy processing, it is necessary to find out up to which file the remote copy has been completed and to perform again the transaction from the middle of the transaction, after the data in the NAS system in operation has been restored by using data in the remote copy destination NAS system, or after the operation has been resumed in the remote copy destination NAS system, to thereby deal with the situation.

This invention has been made in view of the above-mentioned problems, and an object of the invention is to provide a technology, which can be applied to a NAS system for conducting remote copy of differential snapshots on a block basis in a volume, for ensuring, in a case where the remote copy has failed due to a failure which has occurred in a NAS system or the like of remote copy source, the consistency of data that has already been remote-copied, of the data included in the blocks which have already been received, on a file basis.

The present invention provides a data recovery method in differential remote backup for a NAS system, which is used in a system including: a first NAS system for providing a first operational volume which includes files to be accessed through a network; a second NAS system for providing a second operational volume which stores a replication of the first operational volume through the network; and a management computer for managing the first NAS system and the second NAS system, the data recovery method being used for recovering the second operational volume in the second NAS system when a failure has occurred in the first NAS system, the first NAS system including: a processor for performing computing processing; a first memory for storing information; a first differential volume for storing differential data between snapshots of the first operational volume; a first differential management processing module for managing the differential data; a first transfer processing module for transferring data to the second NAS system; and differential management information for managing a correspondence between identification information for identifying blocks in the first operational volume, the blocks each storing update data of updated files of the files stored in the first operational volume, and identification information for identifying blocks in the first differential volume storing differential data of the updated files, the second NAS system including: a processor for performing computing processing; a second memory for storing information; a second differential volume for storing differential data between snapshots of the second operational volume; a second differential management processing module for managing the differential data; and a second transfer processing module for receiving data transferred from the first transfer processing module, the management computer including: a processor for performing computing operation; a third memory for storing information; a third transfer processing module for communicating with the second NAS system; and a determination processing module for determining whether or not to store the update data and the differential data in the second operational volume and in the second differential volume, respectively, the data recovery method including the steps of: transmitting, by the first transfer processing module, the differential management information to the second transfer processing module; sequentially transmitting, by the first transfer processing module, after the transmission of the differential management information, the update data of the first operational volume and the differential data stored in the first differential volume to the second transfer processing module; storing, by the second transfer processing module, the differential management information received from the first transfer processing module, in the second memory; receiving the update data and the differential data from the first transfer processing module and recording, in the differential management information stored in the second memory, completion of reception of the update data and the differential data, by the second transfer processing module; transmitting, by the second transfer processing module, a reception failure notification to the third transfer processing module when the update data of the differential management information stored in the second memory has not all been received; obtaining, by the third transfer processing module, upon receiving the reception failure notification from the second transfer processing module, the differential management information from the second memory of the second NAS system; storing, by the third transfer processing module, the received differential management information in the third memory; specifying, by the determination processing module, a file from which all the update data and all the differential data have been received, with reference to the differential management information stored in the third memory; transmitting an update instruction of the specified file to the second transfer processing module; and receiving the update instruction and storing update data of the file designated by the update instruction in the second operational volume, by the second transfer processing module.

According to the data recovery method in differential remote backup for a NAS system of this invention, in the case where remote copy has failed during the remote copy in progress due to a failure which has occurred in a remote copy source NAS system, only data included in the files having update data and differential data all transferred to a remote copy destination NAS system is copied to a volume of the remote copy destination NAS system. As regards files which need to be updated simultaneously, when the transfer of the update data and differential data have been completed for all the files, data is copied to a volume of the remote copy destination NAS system. Accordingly, at a point in time when the remote copy fails, the files which have already been remote-copied do not return to a state before remote copy, to thereby prevent a situation where the files are brought back to a state before remote-copying when the operation is resumed. Also, as regards the associated files, it is possible to maintain consistency between the files, which eliminates the need to perform a transaction of a plurality of files again from the middle of the transaction, thereby making it easy to resume operation.

BRIEF DESCRIPTION OF THE DRAWINGS

FIG. 8 is an explanatory diagram illustrating an example of a differential management table according to the first embodiment of this invention.

FIG. 9 is an explanatory diagram illustrating an example of file management information according to the first embodiment of this invention.

DETAILED DESCRIPTION OF THE PREFERRED EMBODIMENTS

Hereinafter, an embodiment of this invention will be described with reference to the accompanying drawings.

First Embodiment

Figure 1:
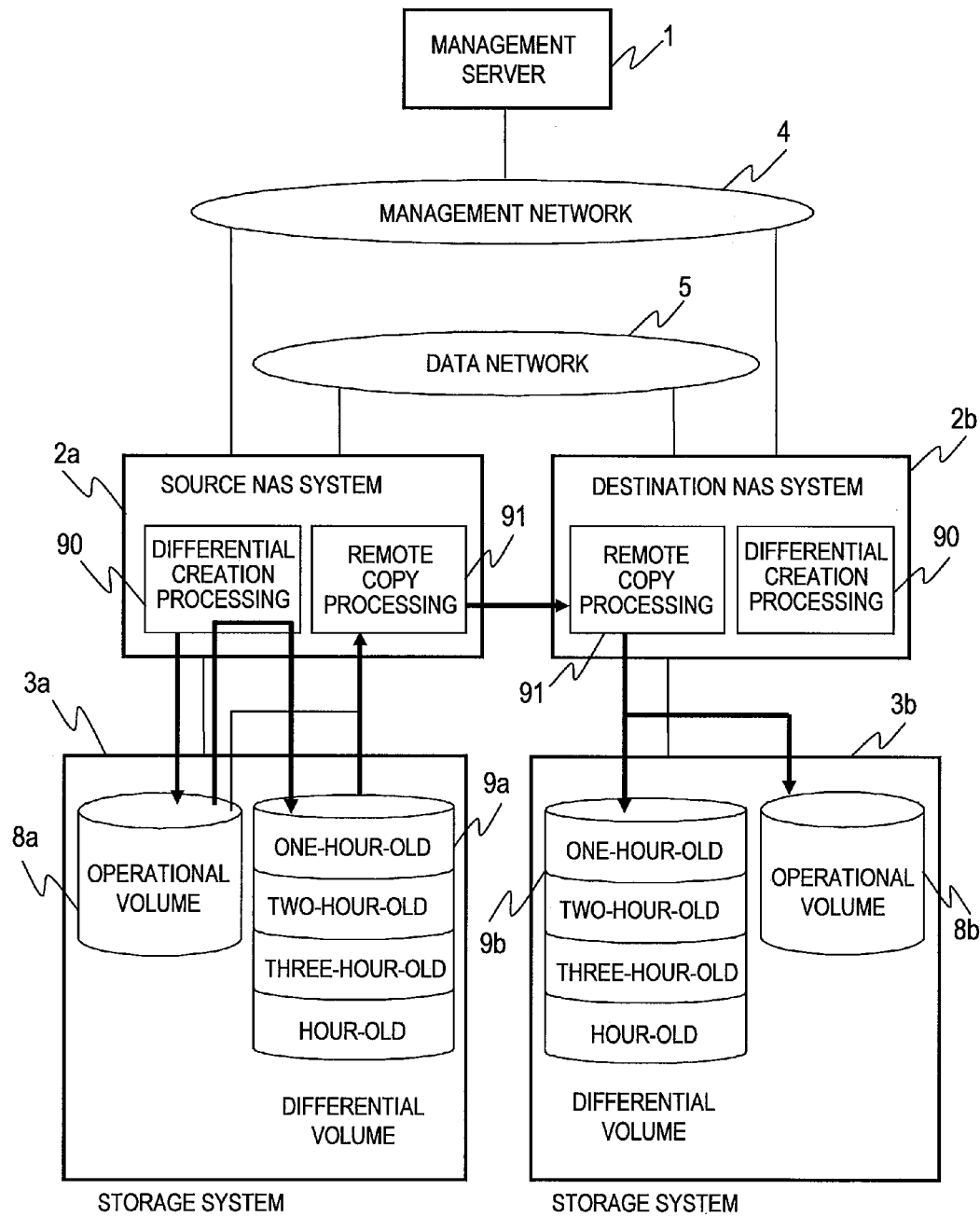
FIG. 1 is a block diagram showing an outline of a storage network system to which a first embodiment of this invention is applied.

A first embodiment of this invention will be described in general with reference to FIG. 1. FIG. 1 is a block diagram of a storage network system to which the first embodiment of this invention is applied, and shows an outline of the first embodiment.

Figures 3, 4, 5:
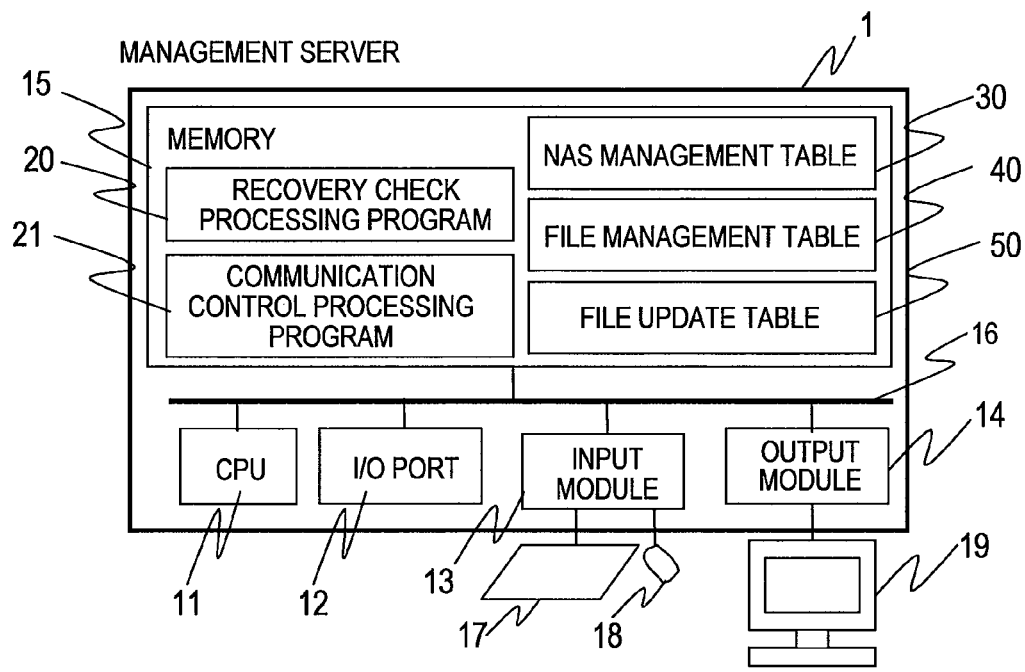
FIG. 3 is a block diagram plainly illustrating an example of a configuration of a management server (1) according to the first embodiment of this invention.
FIG. 4 is an explanatory diagram illustrating an example of a NAS management table according to the first embodiment of this invention.
FIG. 5 is an explanatory diagram illustrating an example of a file management table according to the first embodiment of this invention.

In FIG. 1, the storage network system according to the first embodiment includes a management server 1, at least one source NAS system 2a, a storage system 3a connected to the source NAS system 2a, at least one destination NAS system 2b, a storage system 3b connected to the destination NAS system 2b, a management network 4 for connecting the management server 1 to the source NAS system 2a and to the destination NAS system 2b, and a data network 5 for connecting the source NAS system 2a and the destination NAS system 2b to each other. In FIG. 5, the management network 4 and the data network 5 are provided as different networks, but the management network 4 and the data network 5 may be formed of the same network.

The storage system 3a has an operational volume 8a and a differential volume 9a, and the storage system 3b has an operational volume 8b and a differential volume 9b. Each of the operational volumes 8a and 8b is a volume for providing a file system to a user (client computer) of each of the NAS systems 2a and 2b. Each of the differential volumes 9a and 9b is a volume for storing differential data (for example, differential snapshots) of each of the operational volumes 8a and 8b, that is, data which has been stored in a block to be updated until data in the operational volume 8a or 8b is updated. The differential data is created at predetermined intervals. In an example of FIG. 1, the differential data is created hourly. The NAS systems 2a and 2b each have a differential creation processing program 90 and a remote copy processing program 91 operating thereon.

When an update request is made by a user to a file system provided by the source NAS system 2a, the differential creation processing program 90 executed by a CPU 61 (see FIG. 7) of the source NAS system 2a stores data, which has been included in a block to be updated of the operational volume 8a, in the differential volume 9a, and stores the content of the update request from the user, in the operational volume 8a.

The remote copy processing program 91 executed by the CPU 61 of the source NAS system 2a executes remote copy for transmitting data included in the updated block of the operational volume 8a and latest differential data in the differential volume 9a (in FIG. 1, one-hour-old differential data), to the destination NAS system 2b, together with file names corresponding to the data. The data thus transmitted is received by the remote copy processing program 91 executed by a CPU 61 of the destination NAS system 2b, and stored in the operational volume 8b and the differential volume 9b.

In a case where the above-mentioned remote copy processing executed by the remote copy processing program 91 has failed due to a failure in the source NAS system 2a or in the storage system 3a, or a failure in the data network 5, the management server 1 specifies files having updated data in all the updated blocks and data before update (differential data) which have already been copied, and notifies the destination NAS system 2b of the files thus specified. The remote copy processing program 91 executed by the CPU 61 of the destination NAS system 2b copies only the data included in an updated block and the differential data which are included in the files notified by the management server 1, to the operational volume 8b and the differential volume 9b.

In the manner as described above, at a point in time when the remote copy has failed, files which have already been remote-copied to the destination NAS system 2b do not return to a state before the remote copy, to thereby prevent a situation where the copied file are brought back to a state before remote-copying when the operation is resumed.

The above-mentioned first embodiment of this invention will be described in detail with reference to FIGS. 2 to 18.

Figure 2:
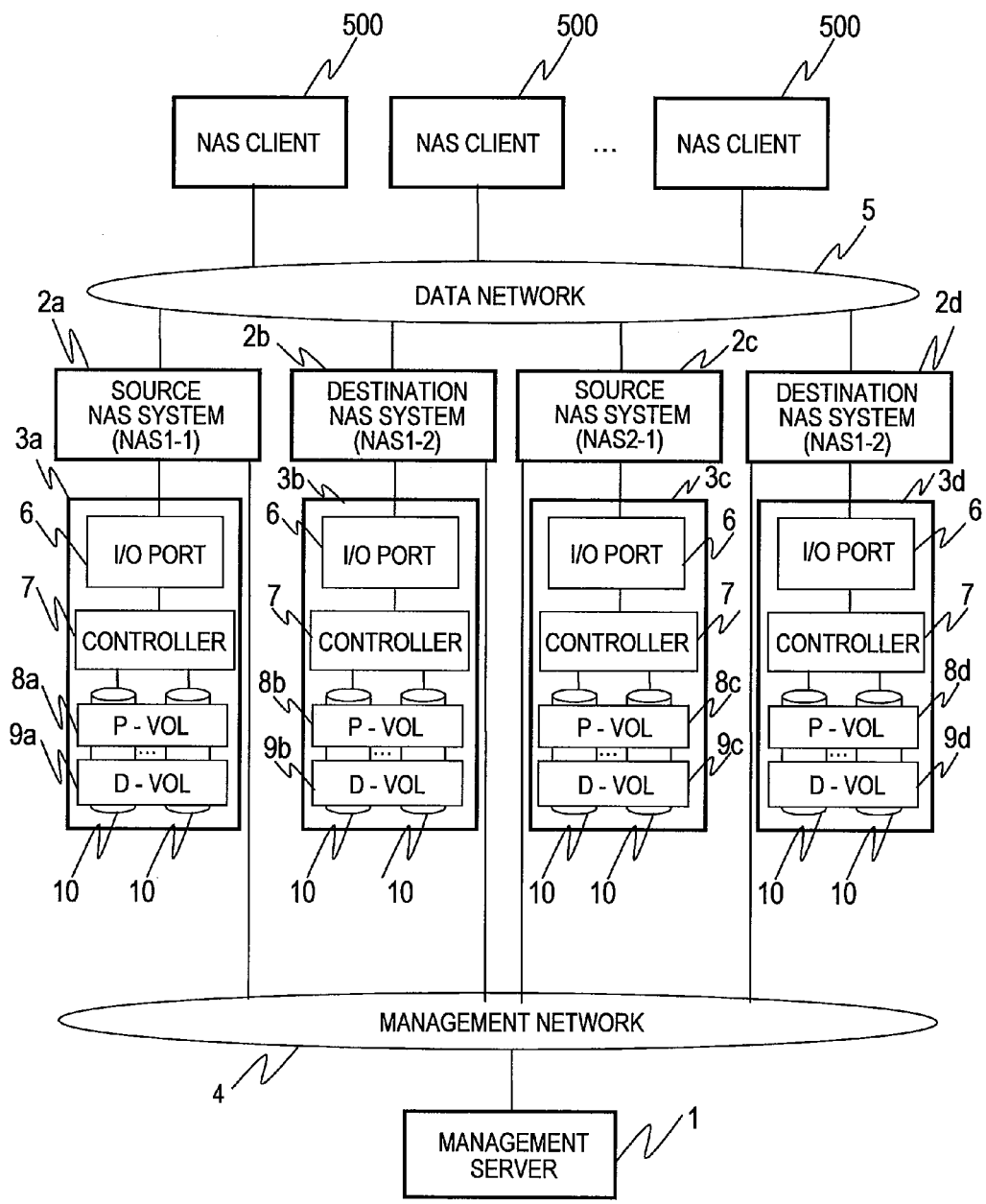
FIG. 2 is a block diagram of the storage network system to which the first embodiment of this invention is applied.

FIG. 2 is a block diagram plainly illustrating the storage network system to which the first embodiment of this invention is applied.

In FIG. 2, the storage network system according to the first embodiment includes the management server 1, at least one of source NAS systems 2a, and 2c, at least one of storage systems 3a and 3c connected the source NAS system 2a or 2c, respectively, at least one of destination NAS systems 2b and 2d, at least one of storage systems 3b and 3d connected to the destination NAS system 2b or 2d, respectively, the management network 4 for connecting the management server 1 to the source NAS systems 2a and 2c and to the destination NAS systems 2b and 2d, and the data network 5 for connecting NAS clients 500, which use file systems provided by the source NAS systems 2a and 2c, to the source NAS systems 2a and 2c and to the destination NAS systems 2b and 2d.

The NAS clients 500 are formed of personal computers or workstations. The NAS clients 500 are connected to file system (for example, NFS or CIFS) services provided by the source NAS systems 2a and 2c, and access to the file systems provided by the source NAS systems 2a and 2c.

The storage systems 3a and 3b each include at least one I/O port 6 for connecting the source NAS system 2a and the destination NAS system 2b to each other, a controller 7 for controlling the storage system, and at least one disk drive 10 including at least one of operational volumes (P-VOLs) 8a and 8b and at least one of differential volumes (D-VOLs) 9a and 9b.

In response to a read and write request (access request), with respect to a volume, made by the NAS system 2a or 2b, the controller 7 reads out of, or writes to the operational volume 8a or 8b and the differential volume 9a or 9b. It should be noted that the source NAS system 2a and the storage system 3a, and the destination NAS system 2b and the storage system 3b are structured similarly to those in FIG. 1 and conduct remote copy.

In FIG. 2, the NAS systems 2a and 2b and the storage systems 3a and 3b form a first copy pair. In addition, the NAS systems 2c and 2d and the storage systems 3c and 3d form a second copy pair. In the second copy pair, update data and differential data are remote-copied to the destination NAS system 2d from the storage system 3c connected to the source NAS system 2c, and written into the storage system 3d connected to the destination NAS system 2d. The source NAS system 2c, the destination NAS system 2d, and the storage systems 3c and 3d are configured similarly to the source NAS system 2a, the destination NAS system 2b, and the storage systems 3a and 3b described above.

In FIG. 2, there are provided the first copy pair formed of the NAS systems 2a and 2b and the storage systems 3a and 3b and the second copy pair formed of the NAS systems 2c and 2d and the storage systems 3c and 3d. Hereinafter, in order to identify each of the copy pairs, the source systems (the NAS system 2a and the storage system 3a) are identified as NAS1-1, and the destination systems (the NAS system 2b and the storage system 3b) are identified as NAS1-2, which form the first copy pair. Similarly, the source systems (the NAS system 2c and the storage system 3c) are identified as NAS2-1, and the destination systems (the NAS system 2d and the storage system 3d) are identified as NAS 2-2, which form the second copy pair.

FIG. 3 is a block diagram plainly illustrating an example of a configuration of the management server 1. As shown in FIG. 3, the management server 1 includes a CPU 11, an I/O port 12 for connecting to the management network 4, an input module 13 connecting to a keyboard 17 or a mouse 18, an output module 14 connecting to a display module 19, a memory 15, and an internal bus 16 connecting the CPU 11, the I/O port 12, the input module 13, the output module 14, and the memory 15 to one another.

The memory 15 stores a communication control processing program 21 for performing communication according to a communication protocol on the management network 4 and a recovery check processing program 20 for implementing a data recovery method used in differential remote backup for the NAS system according to this invention. The CPU 11 executes those programs. The memory 15 also stores a NAS management table 30, a file management table 40, and a file update table 50, which are used by the recovery check processing program 20. Although not shown in the figure, the memory 15 further stores an operating system.

FIG. 4 is an explanatory diagram illustrating an example of contents of the NAS management table 30. As shown in FIG. 4, the NAS management table 30 includes an ID field for storing IDs for identifying registered information, a field 32 for storing names (NAS1-1 to NAS 2-2) for identifying each of the NAS systems 2a, 2b, 2c, and 2d, a field 33 for storing types of the NAS systems for identifying whether the NAS system is the source NAS system 2a or 2c, or the destination NAS system 2b or 2d, and a field 34 for storing IP addresses set to I/O ports to be used by the NAS systems 2a, 2b, 2c, and 2d for connecting to the management network 4. It should be noted that the remote copy is conducted between the storage systems corresponding to the entries having the same value in the ID field 31.

For example, with reference to the entries each having a value of "001" in the ID field 31, it is understood that data in the source NAS system 2a having an IP address of "192.168.1.1" is remote-copied to the destination NAS system 2b having an IP address of "192.168.1.2".

FIG. 5 is an explanatory diagram illustrating an example of the file management table 40. As shown in FIG. 5, the file management table 40 includes an ID field 41 for registering IDs for identifying registered information, a field 42 for storing NAS names for identifying each of the destination NAS systems 2b and 2d, and a field 43 for storing file names. It is indicated that the files designated by the entries having the same value in the ID field 41 maintain consistency. Hereinafter, the files which need to maintain consistency are referred to as associated files.

For example, with reference to the entries each having an ID of "001", it is indicated that, in the destination NAS system 2b with a name of "NAS 1-2", files having names of "File 1" and "File 2" maintain consistency. Also, with reference to the entries each having an ID of "002", it is indicated that, a file having a name of "File 3" in the source NAS system 2c with the name of "NAS 2-1" and a file having a name of "File 4" in the destination NAS system 2d with a name of "NAS 2-2" maintain consistency.

Figure 6:
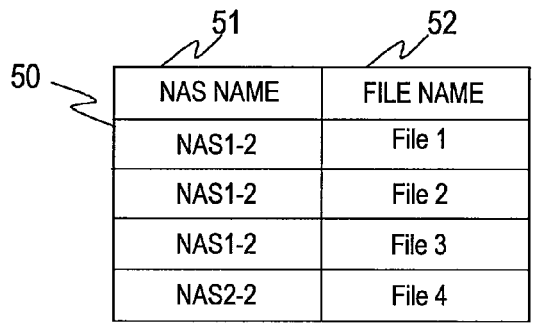
FIG. 6 is an explanatory diagram illustrating an example of a file update table according to the first embodiment of this invention.

FIG. 6 is an explanatory diagram illustrating an example of the file update table 50. As shown in FIG. 6, the file update table 50 includes a field 51 for storing NAS system names for identifying each of the destination NAS system 2b or 2d, and a field 52 for storing names of files to be updated.

For example, it is indicated that, in the destination NAS system 2b with the NAS system name of "NAS1-2", a file having a name of "File 1" can be updated.

Figure 7:
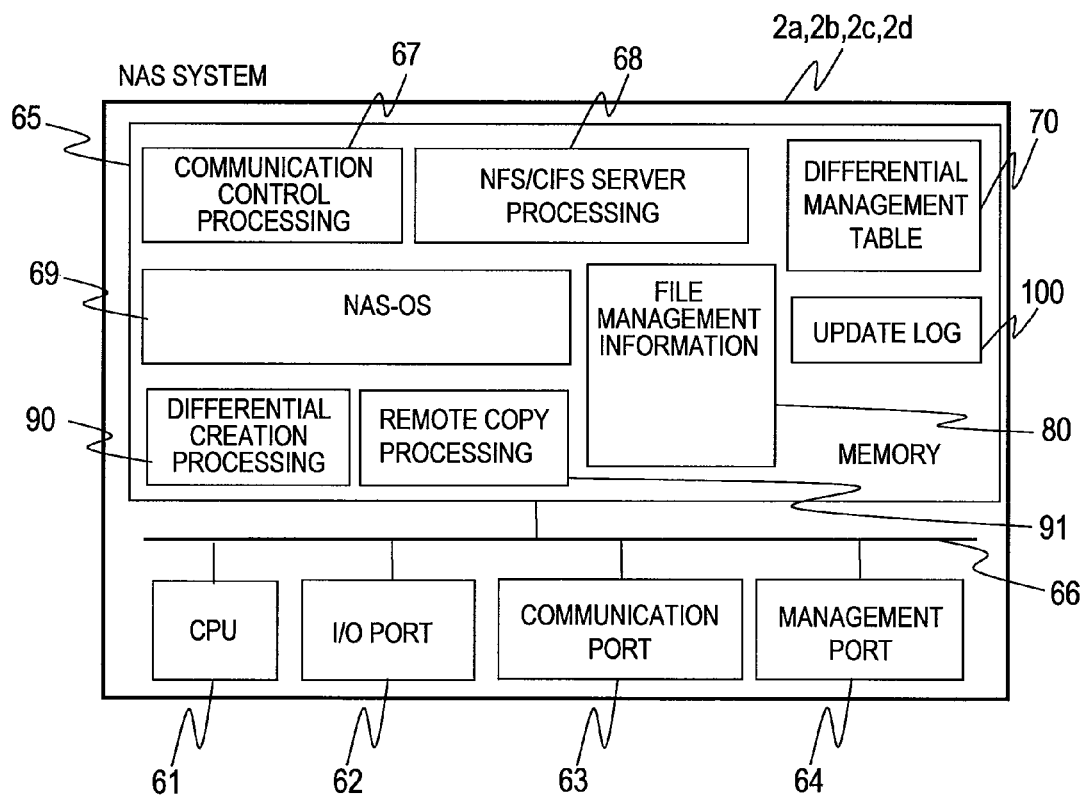
FIG. 7 is a block diagram illustrating an example of a NAS system according to the first embodiment of this invention.

FIG. 7 is a block diagram illustrating an example of a configuration of each of the NAS systems 2a, 2b, 2c, and 2d. As shown in FIG. 7, the NAS systems 2a, 2b, 2c, and 2d each include a CPU (processor) 61, at least one I/O port 62 for connecting to the storage system 3a, 3b, 3c, or 3d, at least one communication port 63 for connecting to the data network 5, a management port 64 for connecting to the management network 4, a memory 65, and an internal bus 66 for connecting the CPU 61, the I/O port 62, the communication port 63, the management port 64, and the memory 65 to one another.

The memory 65 stores a communication control processing program 67 for performing communication according to a communication protocol on the management network 4 or on the data network 5, an NFS/CIFS server processing program 68 for providing a function of enabling a host computer (NAS client 500) to make access to one of the volumes 8a to 8d and 9a to 9d provided by the NAS systems 2a, 2b, 2c, and 2d, a NAS-OS 69 for implementing a process corresponding to contents of reading and writing with respect to a file, the contents being received by the NFS/CIFS server processing program 68 from the host computer, a differential creation processing program 90 for creating differential data of data in an updated file, and a remote copy processing program 91 for conducting remote copy between the NAS systems 2a and 2b or between the NAS systems 2c and 2d. The CPU 61 executes those programs. The memory 65 also stores a differential management table 70, file management information 80, and an update log 100.

FIG. 8 is an explanatory diagram illustrating an example of the differential management table 70. The differential management table 70 includes a field 71 for storing file names of updated files, a field 72 for storing Ids for identifying blocks in the operational volumes 8a, 8b, 8c, and 8d which store data in files corresponding to the file names stored in the field 71, a field 73 for storing Ids for identifying blocks in the differential volumes 9a, 9b, 9c, and 9d which store data before update, that is, differential data in blocks corresponding to the Ids in the field 72, and a field 74 for storing completion flags indicating whether or not a latest update block and a latest differential block each corresponding to the entry have been transmitted from the source NAS system 2a or 2c to the destination NAS system 2b or 2d.

The field 73 sequentially stores Ids of blocks at intervals at which differential data is created. For example, in a case where differential data is created hourly, a field 73a stores Ids of block storing n-hour-old data, and a field 73b registers Ids of blocks storing (n−1)-hour-old data. Also, when the value of the field 74 is "0", it is indicated that the transmission is not performed, and when the value is "1", it is indicated that the transmission is completed. The field 73 has n number of fields 73a to 73n, so as to correspond to n hours during which differential data is managed.

For example, it is indicated that, of the blocks in the operational volumes 8a, 8b, 8c, and 8d storing data in a file having a file name of "File 1", Ids of updated blocks are "P1" and "P2", block Ids of updated blocks in the differential volumes 9a, 9b, 9c, and 9d storing n-hour-old differential data (field 73a) and (n−1)-hour-old differential data (field 73b) of the block "P1" are "D1" and "D2", respectively, the block "P2" is not updated n hours before (field 73a), and a block Id of updated blocks in the differential volumes 9a, 9b, 9c, and 9d storing (n−1)-hour-old differential data (field 73b) of the block "P2" is "D6". It is further indicated that, since the updated blocks "P1" and "P2" each have a completion flag set to "1", the latest update block and the latest differential block of "File 1" have been transmitted from the source NAS system 2a to the destination NAS system 2b.

Also, it is indicated that Ids of updated blocks in the operational volumes 8a and 8b storing a file having a file name of "File 3" are "P5" and "P2". As regards the block Ids in the differential volumes storing differential data, block Ids in a differential volume storing n-hour-old differential data and (n−1)-hour-old differential data of the block "P5" are "D4" and "D8", the block "P2" is not updated n hours before, a block Id in the differential volumes 9a and 9b storing (n−1)-hour-old differential data of the block "P2" is "D6". It is also indicated that a block having a block Id of "D6" in a differential volume has been transmitted from the source NAS system 2a to the destination NAS systems 2b and 2d. It is also understood that file data of a file having a file name of "File 1" and file data of a file having a file name of "File 3" are stored in part in a block of "P2" in the operational volumes 8a, 8b, 8c, and 8d. In other words, it is indicated that a file of "File 1" and a file of "File 3" both have part of data thereof stored in the same block.

FIG. 9 is an explanatory diagram illustrating an example of the file management information 80. The file management information 80 includes a field 81 for storing file names, and a field 82 for storing IDs for identifying the blocks in the operational volumes 8a, 8b, 8c, and 8d storing data of files corresponding to the file names in the field 81.

For example, it is understood that Ids of blocks in the operational volumes 8a, 8b, 8c, and 8d storing data of a file with a file name of "File 1" are "P1", "P2", and "P6", and Ids of blocks in the operational volumes 8a, 8b, 8c, and 8d storing data of a file with a file name of "File 3" are "P5", "P2", and "P8". It is also understood that a bock having the block Id of "P2" of the operational volumes 8a, 8b, 8c, and 8d stores data of a file with a file name of "File 1" and data of a file with a file name of "File 3".

Figures 10, 11:
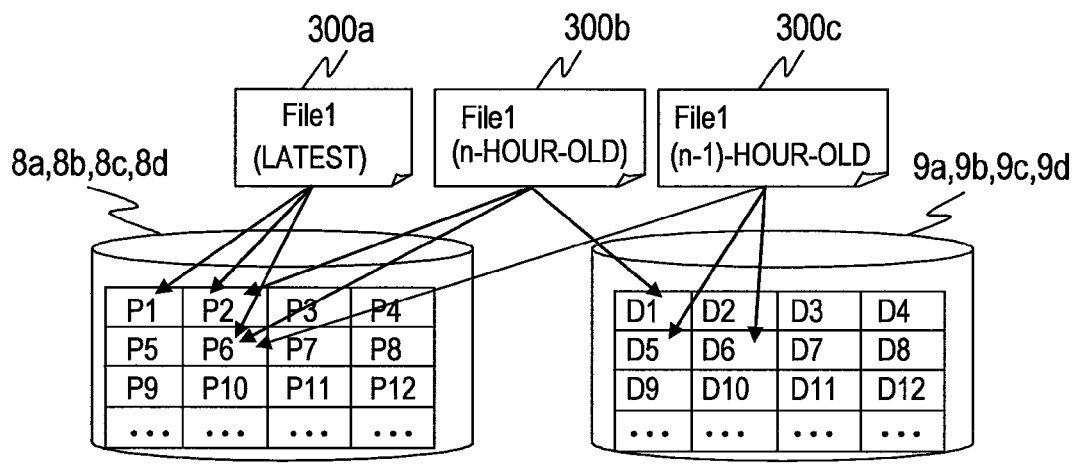
FIG. 10 is a block diagram illustrating generations and storage locations of files on volumes according to the first embodiment of this invention.
FIG. 11 is an explanatory diagram illustrating an example of an update log according to the first embodiment of this invention.

FIG. 10 is a block diagram illustrating a relation between the files each having a file name of "File 1", blocks in the operational volumes 8a, 8b, 8c, and 8d, and blocks in the differential volumes 9a, 9b, 9c, and 9d, the relation being defined based on the contents of the differential management table 70 of FIG. 8 and the file management information 80 of FIG. 9. As shown in FIG. 10, the latest "File 1" includes data stored in the blocks having block Ids of "P1", "P2", and "P6" in the operational volume 8a or 8b. Also, the n-hour-old "File 1" includes data stored in the blocks having block Ids of "P2" and "P6" in the operational volume 8a, 8b, 8c, or 8d and data stored in the block having a block Id of "D1" in the differential volume 9a, 9b, 9c, or 9d. Further, the (n−1)-hour-old "File 1" includes data stored in the block having a block Id of "P6" in the operational volume 8a, 8b, 8c, or 8d and data stored in the blocks having block Ids of "D5" and "D6" in the differential volume 9a, 9b, 9c, or 9d.

FIG. 11 is an explanatory diagram illustrating an example of contents of the update log 100. The update log 100 includes a field 101 for storing file names of updated files, a field 102 for storing date and time at which each file has been updated, and a field 103 for storing names of users who have updated the files. The update user name in the field 103 may include an identifier of a NAS client 500 which has updated the file.

For example, it is understood that a file having a file name of "File 1" is updated on "2007/07/16 08:40" by a user "User 1".

Figure 12:
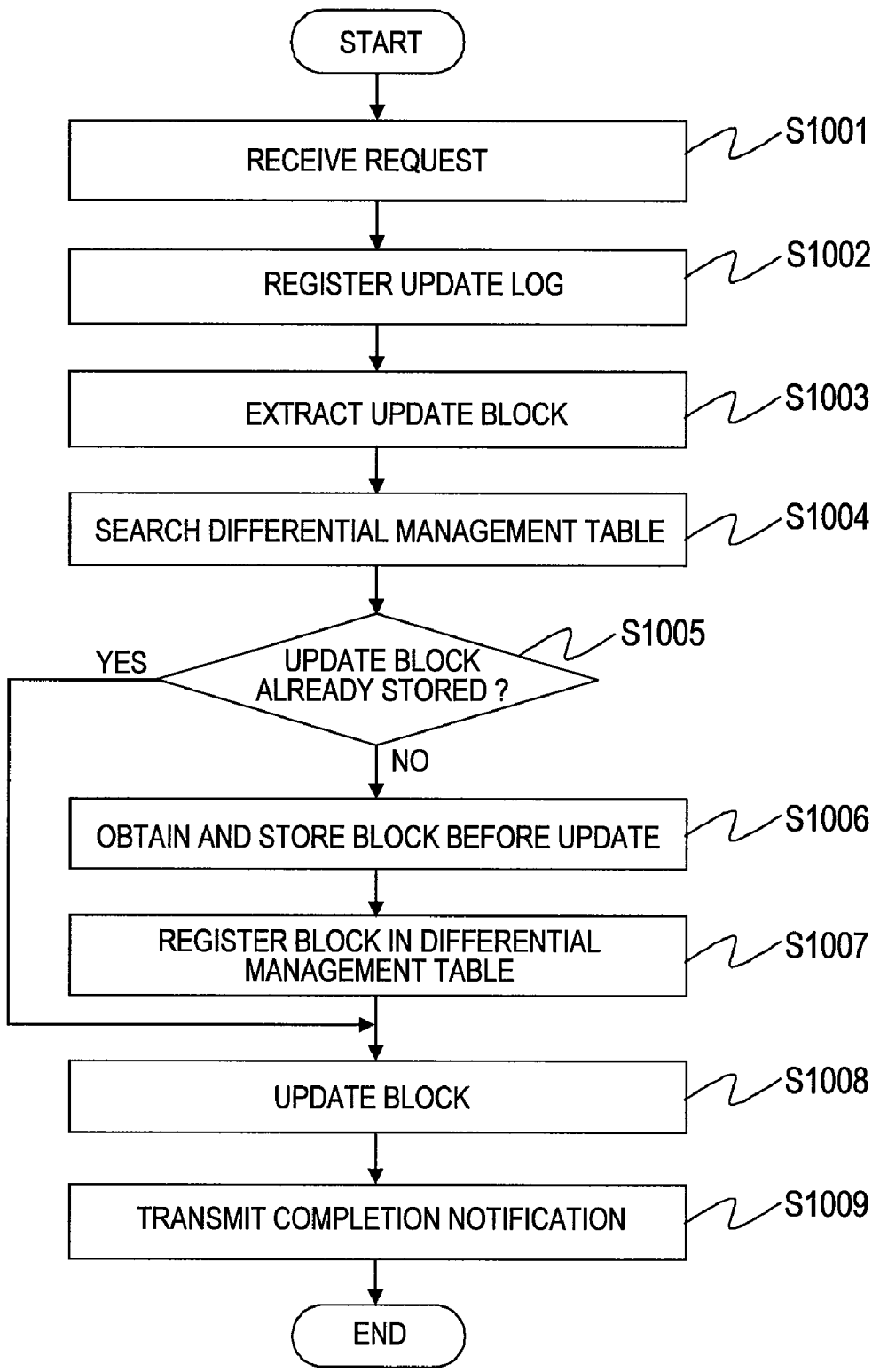
FIG. 12 is a flowchart for illustrating an example of a process of updating a file in a source NAS system according to the first embodiment of this invention.

Next, with reference to FIG. 12, a processing procedure for updating a file in the source NAS system 2a or 2c.

FIG. 12 is a flowchart for illustrating a processing procedure for updating a file stored in the operational volume 8a or 8c of the storage system 3a or 3c provided by the source NAS system 2a or 2c.

First, in the NAS system 2a or 2c, the CPU 61 executes the NFS/CIFS server processing program 68, receives a file update request from the NAS client 500 using the operational volume 8a or 8c (S1001), and adds an entry to the update log 100 (S1002). Next, in S1003, the NAS-OS 69 specifies, with reference to the file management information 80, a block to be updated in the operational volume 8a or 8c corresponding to the file to which the update request has been made. Next, the CPU 61 executes the differential creation processing program 90, and determines, in S1004, with reference to the differential management table 70, whether the block specified in S1003 is stored in the differential management table 70 (S1005). In the case where it is determined, as a result of the determination in S1005, that the corresponding block is not stored in the differential management table 70, the process proceeds to S1008 after implementing S1006 and S1007. When it has been determined that the corresponding block is stored in the differential management table 70, the process directly proceeds to S1008.

In S1006, data is stored in the block, which has been specified in S1003, in the differential volume 9a or 9c. Next, in S1007, a block of the differential volume 9a or 9c in which data is stored in S1006 is stored in an entry of the differential management table 70, the entry corresponding to the block specified in S1003. At this time, when the differential management table 70 does not have an entry corresponding to the block specified in S1003, a new entry is additionally provided thereto. Also, a value in the field 74 of completion flag is set to "0".

In S1008, data included in the update request from the host computer is stored in the block of the operational volume 8a or 8c specified in S1003. Lastly, the CPU 61 executes the NFS/CIFS server processing program 68 and the communication control processing program 67, and notifies to the host computer that the update of the file has been completed.

Through the above-mentioned processes, when an update request of a file is made by a host computer such as the NAS client 500, a block of the operational volume 8a or 8c which includes the file is first stored in the differential volume 9a or 9c, and then data included in the update request is written into the operational volume 8a or 8c.

Next, with reference to FIGS. 13 and 14, a processing procedure for conducting remote copy of differential data will be described, by taking as an example where differential remote copy is conducted between the source NAS system 2a and the destination NAS system 2b.

Figure 13:
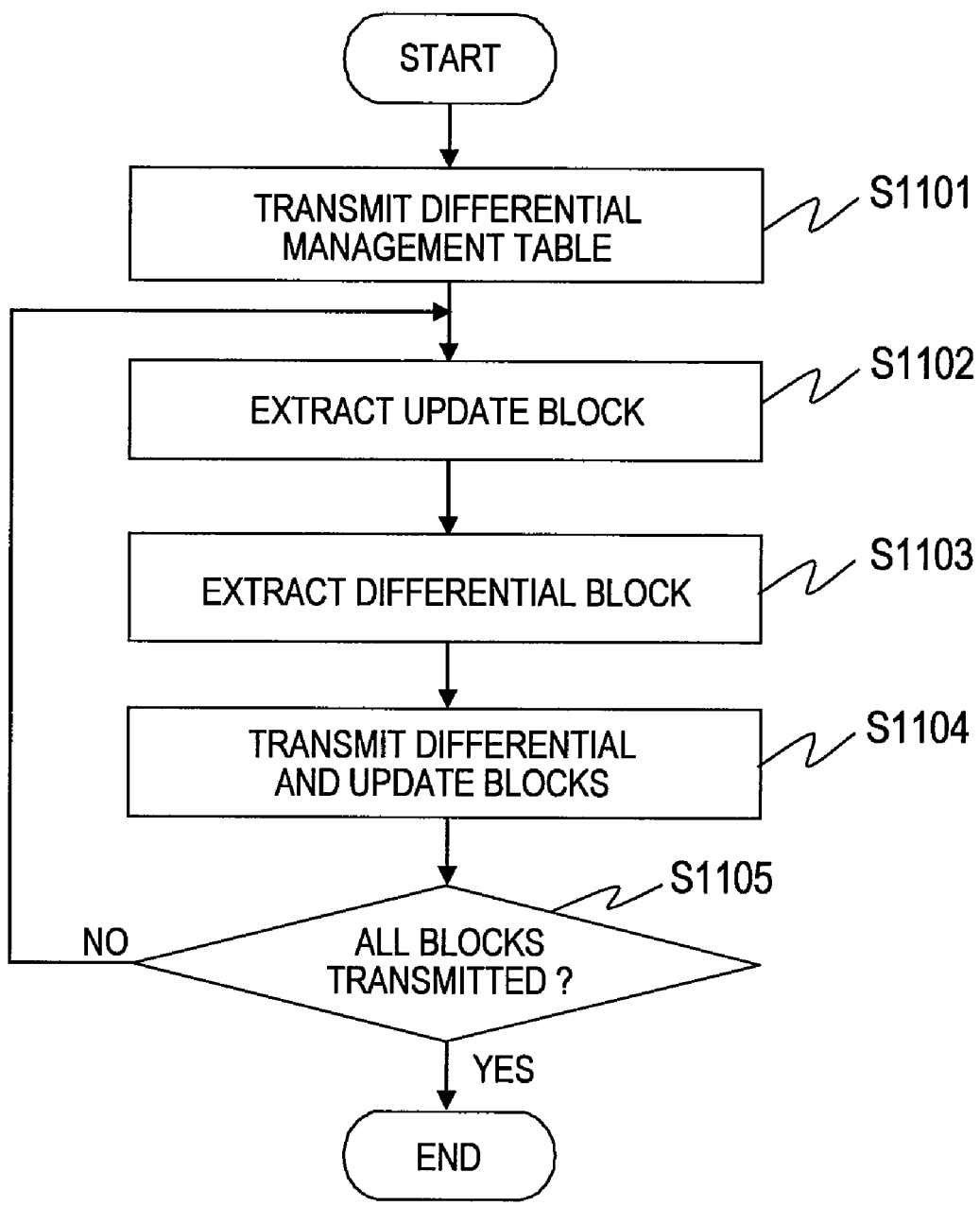
FIG. 13 is a flowchart for illustrating an example of a process of transmitting update data and differential data, the process being implemented by a remote copy processing program of the source NAS system, according to the first embodiment of this invention.

FIG. 13 is a flowchart of a process in which the CPU 61 of the source NAS system 2a transmits update data and differential data to the destination NAS system 2b by executing the remote copy processing program 91. The process is started in response to an instruction to execute remote copy given by an administrator through the management server 1 or the like. It should be noted that the NAS system 2c performs the similar process.

The CPU 61 of the source NAS system 2a executes the remote copy processing program 91, and first transmits, in S1101, all the entries of the differential management table 70 to the destination NAS system 2b. Next, in S1102, the CPU 61 obtains update block Ids set in the field 72 of the differential management table 70, and reads data stored in blocks of the operational volume 8a corresponding to the update block Ids thus obtained. Then, in S1103, the CPU 61 obtains differential block Ids stored in the field 73 (fields 73a to 73n) of the differential management table 70, and reads data in blocks of the differential volume 9a corresponding to the differential block Ids thus obtained.

Next, in S1104, data of the update blocks and data of the differential blocks, which have been read out in S1102 and S1103 as described above, are transmitted to the destination NAS system 2b through the communication control processing program 67 executed by the CPU 61. Next, in S1105, it is determined whether the differential blocks and the update blocks of all the entries stored in the differential management table 70 have been transmitted to the destination NAS system 2b, and in the case where there still remains an entry having the update block and the differential block yet to be transmitted, the process returns to S1102, in which the process is executed with respect to a next entry in the differential management table 70. When it is determined in S1105 that all the entries have been processed, the process is ended.

It should be noted that there has been described an example where the above-mentioned process is executed in response to an instruction from an administrator. However, the process may be executed at predetermined intervals.

Figure 14:
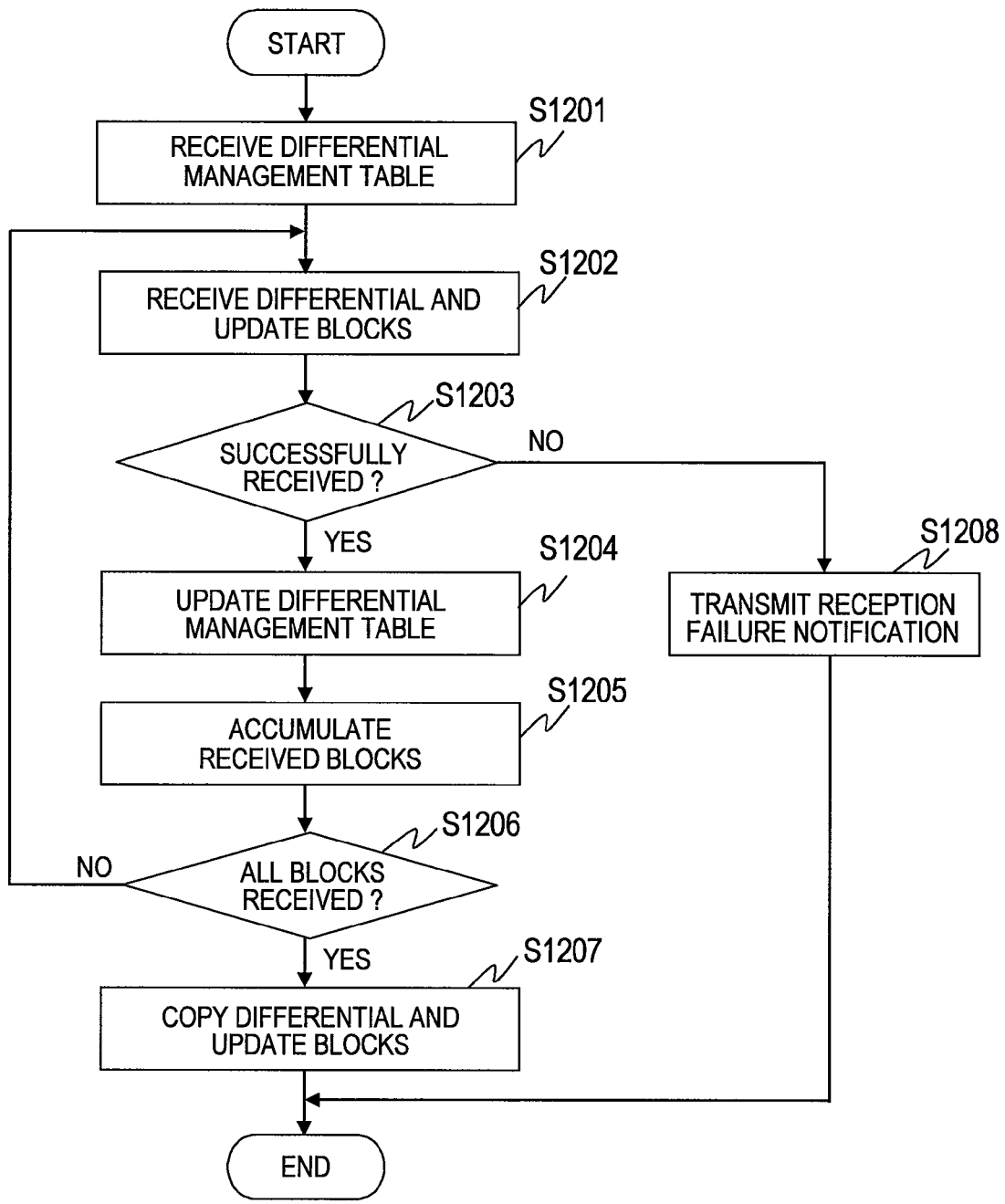
FIG. 14 is a flowchart for illustrating an example of a process of receiving update data and differential data, the process being implemented by a remote copy processing program of the source NAS system, according to the first embodiment of this invention.

FIG. 14 shows a process flow in which the CPU 61 of the destination NAS system 2b receives update data and differential data from the source NAS system 2a by executing the remote copy processing program 91. It should be noted that the NAS system 2d which receives data from the NAS system 2c performs the similar process.

The CPU 61 of the destination NAS system 2b executes the remote copy processing program 91, and first receives, in S1201, the differential management table 70 from the source NAS system 2a and stores the differential management table 70 in the memory 65. Next, in S1202, the CPU 61 receives the update block and the differential block transmitted from the source NAS system 2a. Then, in S1203, it is determined whether the update block and the differential block have been successfully received. In the case where it is determined, as a result of the determination in S1203, that the reception of the data has failed, a reception failure notice indicating that the reception has failed is transmitted to the management server 1 in S1208, and the process is ended. The reception of the data is determined as being a failure when, for example, an abnormal termination of connection is detected in a case where the communication protocol is TCP/IP or when no response is received with respect to a retransmission request of a missing packet.

In the case where it is determined, as a result of the determination in S1203, that the data has been successfully received, a value in the field 74 of the entry of the differential management table 70 corresponding to the update block and the differential block thus received is updated to "1" (S1204), and data of the update block and the differential block received in S1202 is accumulated on the memory 65 (S1205). Next, in S1206, it is determined all the entries of the differential management table 70 have values updated to "1" in the field 74, that is, it is determined whether all the data included in blocks corresponding to the update block Ids 72 and the differential block Ids 73 of all the entries stored in the differential management table 70 has been received. In the case where there still remains an entry having data included in blocks corresponding to the update block Id 72 and the differential block Id 73 yet to be transmitted, the process returns to S1202, in which data of the update block and the differential block transmitted next from the source NAS system 2a is received.

In the case where it is determined, as a result of the determination in S1206, that data included in blocks corresponding to the update block Ids 72 and the differential block Ids 73 of all the entries of the differential management table 70 have been received, the update data and the differential data accumulated in S1205 are stored in the corresponding blocks of the operational volume 8b and the differential volume 9b in S1207, and the process is ended.

Next, with reference to FIG. 15, a description will be given of a processing procedure implemented by the recovery check processing program 20 which is executed by the CPU 11 of the management server 1. The recovery check processing program 20 is started when the reception failure notification is received from the NAS system 2b or 2d.

Figure 15:
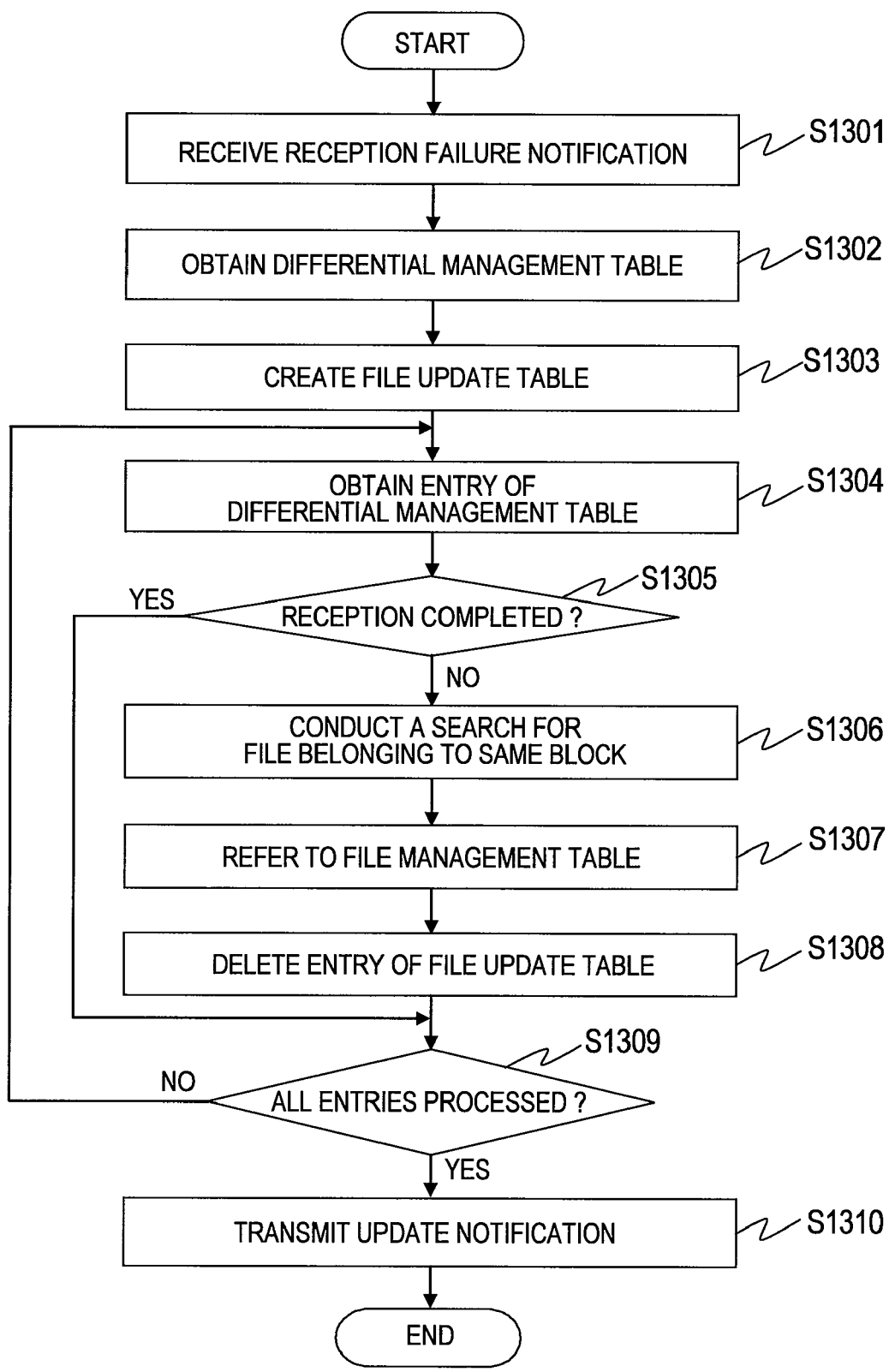
FIG. 15 is a flowchart for illustrating an example of a process implemented by a recovery check processing program which is executed by a management server according to the first embodiment of this invention.

FIG. 15 shows a process flow of the recovery check processing program 20 executed by the CPU 11. The CPU 11 executes the recovery check processing program 20, receives, in S1301, the reception failure notification from the destination NAS system 2b or 2d, and obtains, in S1302, the differential management table 70 of the destination NAS system 2b or 2d which has transmitted the reception failure notification. Next, in S1303, the CPU 11 refers to the differential management table 70 obtained in S1302, and stores, in the file update table 50, file names included in the field 71 corresponding to entries each having a value of the field 74 of completion flag set to "1", together with a name of the destination NAS system 2b or 2d from which the reception failure notification has been received in S1301.

Next, an entry of the differential management table 70 obtained from the destination NAS system 2b or 2d is obtained in S1304, and in S1305, it is determined whether the entry obtained in S1304 has values of the completion flag in the field 74 all set to "1", that is, it is determined whether the entry corresponds to a file from which all the update blocks and all the differential blocks have been received. In the case where it is determined, as a result of determination in S1305, that the entry corresponds to a file from which all the update blocks and all the differential blocks have been received, the process directly proceeds to S1309. In the case where it is determined, as a result of the determination in S1305, that the entry corresponds to a file from which the update blocks and the differential blocks have been received only in part, the processes of S1306, S1307, and S1308 are performed before proceeding to S1309.

In S1306, the differential management table 70 is searched for another entry having an update block Id which is the same as the update block Id in the field 72 of the entry obtained in S1304 stored in the field 72. In other words, a file belonging to the same block as the file whose reception has not been completed is specified.

In S1307, the CPU 11 refers to the file management table 40, searches for an entry having a file name in the field 43 which corresponds to a file name in the field 71 of the entry obtained in S1304, and obtains an Id in the field 41 of the retrieved entry. Then, the CPU 11 searches for another entry having an Id in the field 41 which corresponds to the obtained Id. In other words, an associated file of the file whose reception has not been completed is specified.

In S1308, an entry having a file name in the field 52 which corresponds to a file name of the field 71 of the entry of the differential management table 70 retrieved in S1306, or corresponds to a file name of the field 43 of the file management table 40 retrieved in S1307 is deleted from the file update table 50. As a result, files including a block whose reception has not been completed and associated files thereof are deleted from the file update table 50.

In S1309, it is determined whether the process of S1304 and thereafter have been performed with respect to all the entries of the differential management table 70. In the case where not all the entries have been processed, the process returns to S1304, and the above-mentioned process is performed with respect to a next entry. In the case where it is determined, as a result of the determination in S1309, that all the entries have been processed, in S1310, the destination NAS system 2b or 2d corresponding to the name stored in the field 51 of the file update table 50 is specified and an IP address of the corresponding destination NAS system 2b or 2d is obtained from the NAS management table 30. Then, an update notification is transmitted, together with a file name in the field 52 of the file update table 50, to the destination NAS system 2b or 2d whose IP address is obtained, and the process is ended. At this time, an IP address of the destination NAS system 2b or 2d is specified with reference to the NAS management table 30, and the update notification is transmitted to the IP address thus specified.

Through the above-mentioned processes, the management server 1 obtains, upon receiving the reception failure notification, the differential management table 70 from the destination NAS system which has transmitted the reception failure notification. Then, the management server 1 excludes, of the files in the differential management table 70, files each having a value in the field 74 of completion flag unchanged from "0", which indicates that the reception of data from the source NAS system 2a or 2c has not been completed, associated files of those files, and files belonging to the same blocks as those files. The management server 1 then notifies the destination NAS system 2b or 2d of the remaining files as files that can be updated.

Next, with reference to FIG. 16, a description will be given of a process to be implemented by the remote copy processing program 91 which is executed by the CPU 61 of the destination NAS system 2b or 2d, when an update notification has been received from the management server 1.

Figure 16:
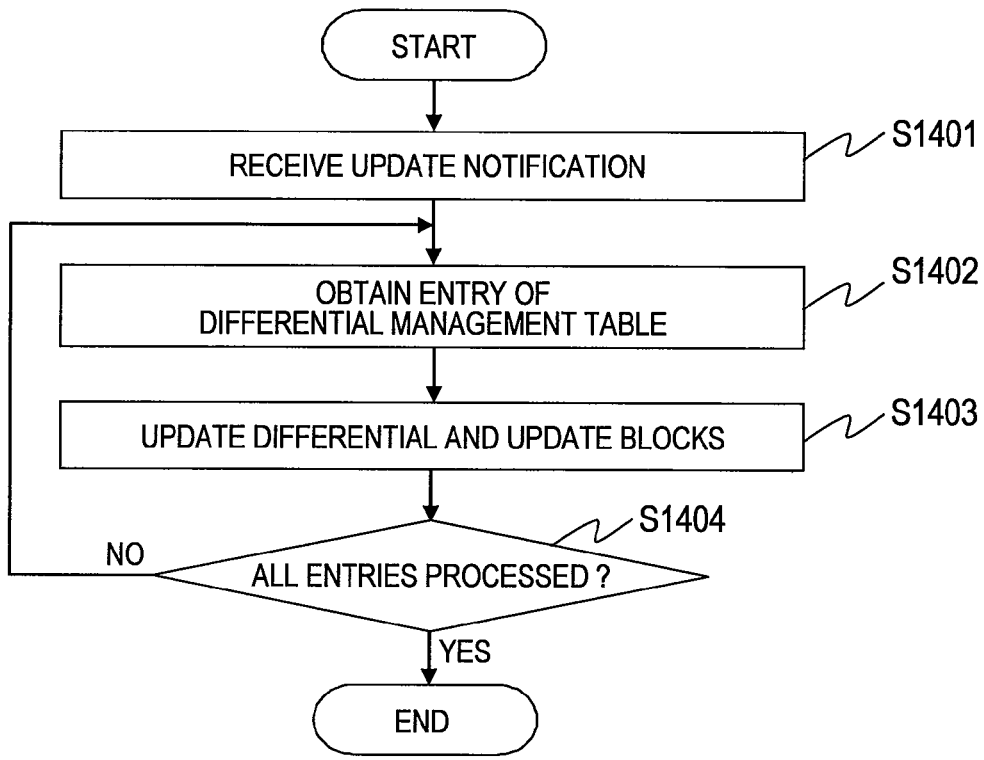
FIG. 16 is a flowchart for illustrating a process performed when an update notification has been received, the process being implemented by the remote copy processing program of the source NAS system according to the first embodiment of this invention.

FIG. 16 is a flowchart for illustrating a process performed when an update notification has been received from the management server 1, the process being implemented by the remote copy processing program 91 which is executed by the CPU 61 of the source NAS system 2b or 2d.

The process implemented by the remote copy processing program 91 which is executed by the CPU 61 proceeds to S1402 when an update notification is received from the management server 1 in S1401. In S1402, an entry having a value in the field 71 which corresponds to a file name designated by the update notification is obtained from the differential management table 70, update data which has been received from the source NAS system 2a or 2c and accumulated on the memory 65 is stored in a block corresponding to a block Id included in the field 72 of the entry of the operational volume 8b or 8d obtained in S1402, and differential data received from the source NAS system 2a or 2c, in which the differential data has been accumulated, is stored in a block corresponding to a block Id in the field 73 of the entry of the differential volume 9b or 9d obtained in S1402. Next, in S1404, it is determined whether all the files designated by the update notification received in S1401 have been processed, and in the case where there still remains a file which has not been processed, the process returns to S1402. In the case where all the files have been processed, the process is ended.

Through the above-mentioned processes, it is possible to update only the files notified by the management server 1 as files that can be updated, by applying the update data and the differential data received from the source NAS system 2a or 2c to the files.

Next, with reference to FIG. 17, a procedure of creating the management table 40 by the management server 1 will be described.

Figure 17:
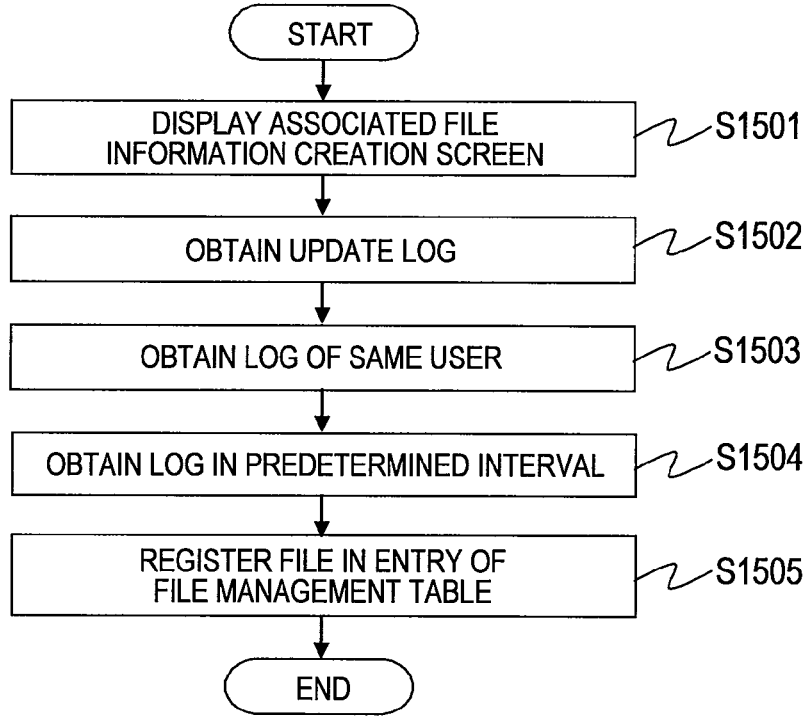
FIG. 17 is a flowchart for illustrating an example of a file management table creation process implemented by the recovery check program (20) which is executed by the management server according to the first embodiment of this invention.

FIG. 17 shows a process flow of creating the management table 40 by the recovery check processing program 20 which is executed by the CPU 11 of the management server 1. This process is implemented upon being started by an administrator or the like using the management server 1.

First, in S1501, an associated file information creation window 200 is displayed on the display system 19.

Figure 18:
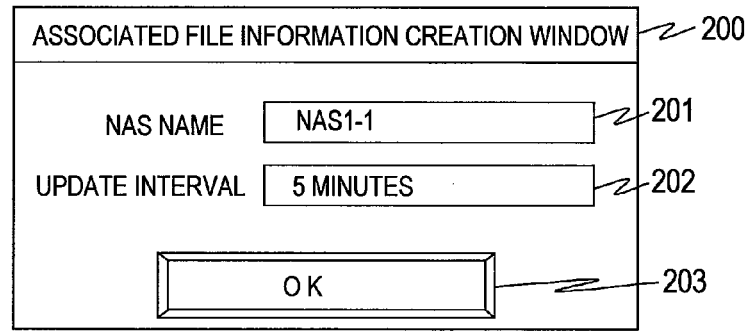
FIG. 18 shows a screen image illustrating an example of an associated file information creation window according to the first embodiment of this invention.

FIG. 18 shows an example of the associated file information creation window 200. The associated file information creation window 200 includes a field 201 for inputting a name of a NAS system, a field 202 for inputting an update interval, and an OK button 203. An administrator inputs, in the field 201, associated file information, that is, a name of a NAS system for which the file management table 40 is to be created, inputs an update interval of files which are handled as associated files, and clicks on the OK button 203.

For example, in the case where the field 202 has "5 minutes" input therein, when a file b is updated three minutes later the update of a file a, the file a and the file b are regarded as associated files. Also, in the case where a file c is updated seven minutes later the update of the file b, the file c is not regarded as being associated with the file a or the file b.

The process implemented by the recovery check processing program 20 which is executed by the CPU 11 proceeds to S1502 when the OK button 203 in the associated file information creation window 200 is clicked on.

In S1502, the update log 100 of a NAS system corresponding to the name input into the field 201 of the associated file information creation window 200 is obtained. Specifically, connection is established, through the communication control program 21 executed by the CPU 11, with respect to an IP address in the field 34 of entries each having a NAS name in the field 32 of the NAS management table 30, the NAS name corresponding to the name input in the field 201, to thereby obtain the update log 100.

Next, in S1503, the entries each corresponding to the update log 100 obtained in S1502 are categorized based on the value in the field 103, that is, on a user (update user) that has updated the file. Then, in S1504, the entries which have been categorized on a user basis in S1503 are further categorized based on the value in the field 102 of the entries included in the update log 100. In other words, the entries which have been input within the update interval input in the field 202 of the associated file information creation window 200 are categorized as associated files. Then, in S1505, a plurality of files updated by the same user within the update interval are extracted as associated files, and attached with the same ID. Then, the associated files attached with the same ID are registered in the file management table 40.

As described above, according to the first embodiment of the data recovery method in the differential remote backup for the NAS system of this invention, in conducting remote copy between the NAS systems by using differential snapshots, blocks in the operational volume storing update data and blocks in the differential volume storing differential data are associated with updated files, and an execution status of the remote copy is recorded, for each block, in the differential management table 70 of the destination NAS system 2b. When the remote copy has failed due to a failure in the source NAS system 2a or 2c, the management server 1 refers to the differential management table 70 of the destination NAS system 2b, and selects files having the update data and the differential data all transferred to the destination NAS system 2b or 2d, as files having data restored in the operational volume 8b or 8d and in the differential volume 9b or 9d of the destination NAS system 2b or 2d. Also, as regards files which need to be updated simultaneously, in the case where the transfer of the update data and the differential data have been completed for all the files, the files are selected as files having data restored in the operational volume 8b or 8d and the differential volume 9b or 9d. The destination NAS system 2b or 2d stores the update data and the differential data of the files selected by the management server 1, in the operational volume 8b or 8d and the differential volume 9b or 9d, respectively. Accordingly, the files which have already remote-copied at a point in time when the remote copy has failed do not return to a state before remote copy, to thereby prevent a situation where the files are brought back to a state before remote-copying when the destination NAS system 2b or 2d has resumed operation. Also, as regards the associated files, it is possible to maintain consistency between the files, which eliminates the need to perform a transaction of a plurality of files again from the middle of the transaction, thereby making it easy to resume operation. Further, the management server 1 selects files to be stored in the destination NAS system 2b or 2d, thereby making it possible to maintain consistency in the files between the NAS systems.

Second Embodiment

Next, a second embodiment of this invention will be described with reference to FIGS. 19 to 23.

Figure 19:
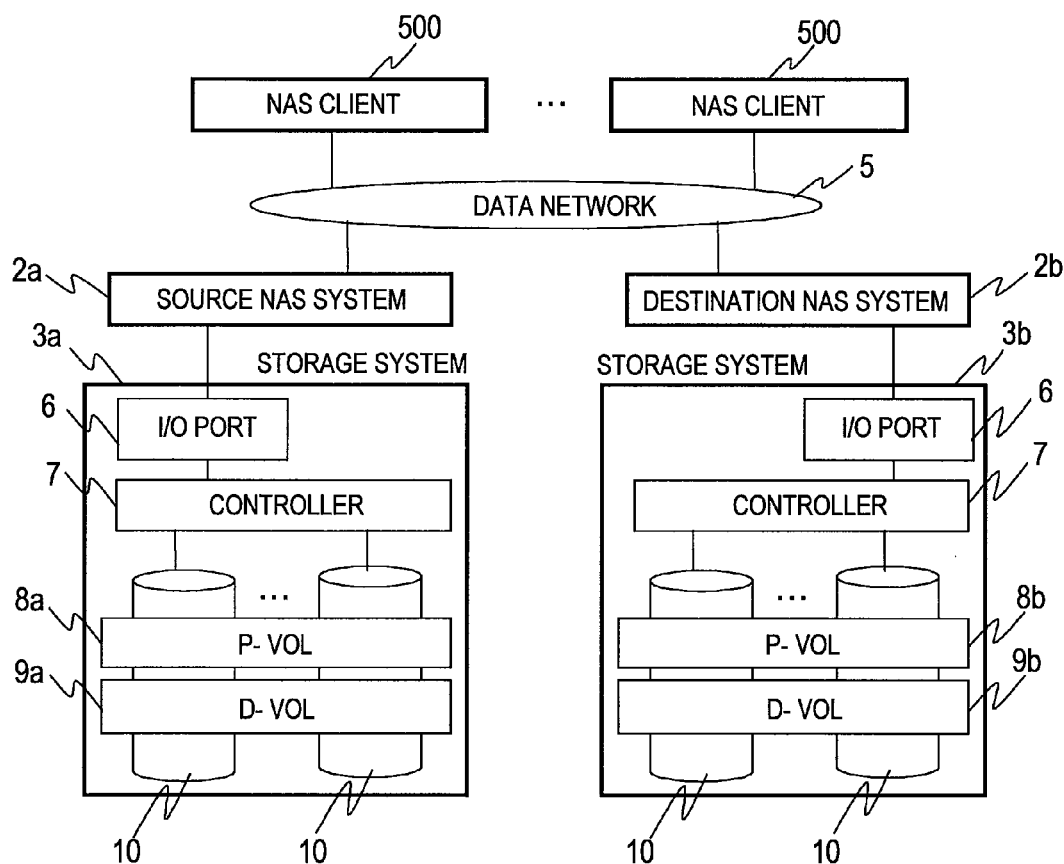
FIG. 19 is a block diagram showing a storage network system to which a second embodiment of this invention is applied.

FIG. 19 is a block diagram plainly showing a storage network system to which the second embodiment of this invention is applied.

As shown in FIG. 19, the storage network system according to the second embodiment includes at least one source NAS system 2a, a storage system 3a connected to the source NAS system 2a, at least one destination NAS system 2b, a storage system 3b connected to the destination NAS system 2b, and a data network 5 to which the source NAS system 2a and the destination NAS system 2b are connected.

The storage systems 3a and 3b each include at least one I/O port 6 for connecting to the source NAS system 2a and 2b, respectively, a controller 7 for controlling the storage system, at least one disk drive 10 including at least one of operational volumes (P-VOLs) 8a and 8b and at least one of differential volumes 9a and 9b. In response to a read and write request made by the NAS system 2a or 2b with respect to a volume, the controller 7 reads out of, or writes to the operational volume 8a or 8b and the differential volume 9a or 9b.

It should be noted that the NAS systems 2a and 2b according to the second embodiment are configured similarly to those of the first embodiment, and therefore the description thereof is omitted. On the other hand, in the second embodiment, the process to be implemented by the remote copy processing program 91 which is executed by the CPU 61 of each of the source NAS system 2a and the destination NAS system 2b is different from that of the first embodiment.

Hereinbelow, an example of the process to be implemented by the remote copy processing program 91 which is executed by the CPU 61 according to the second embodiment will be described.

Figure 20:
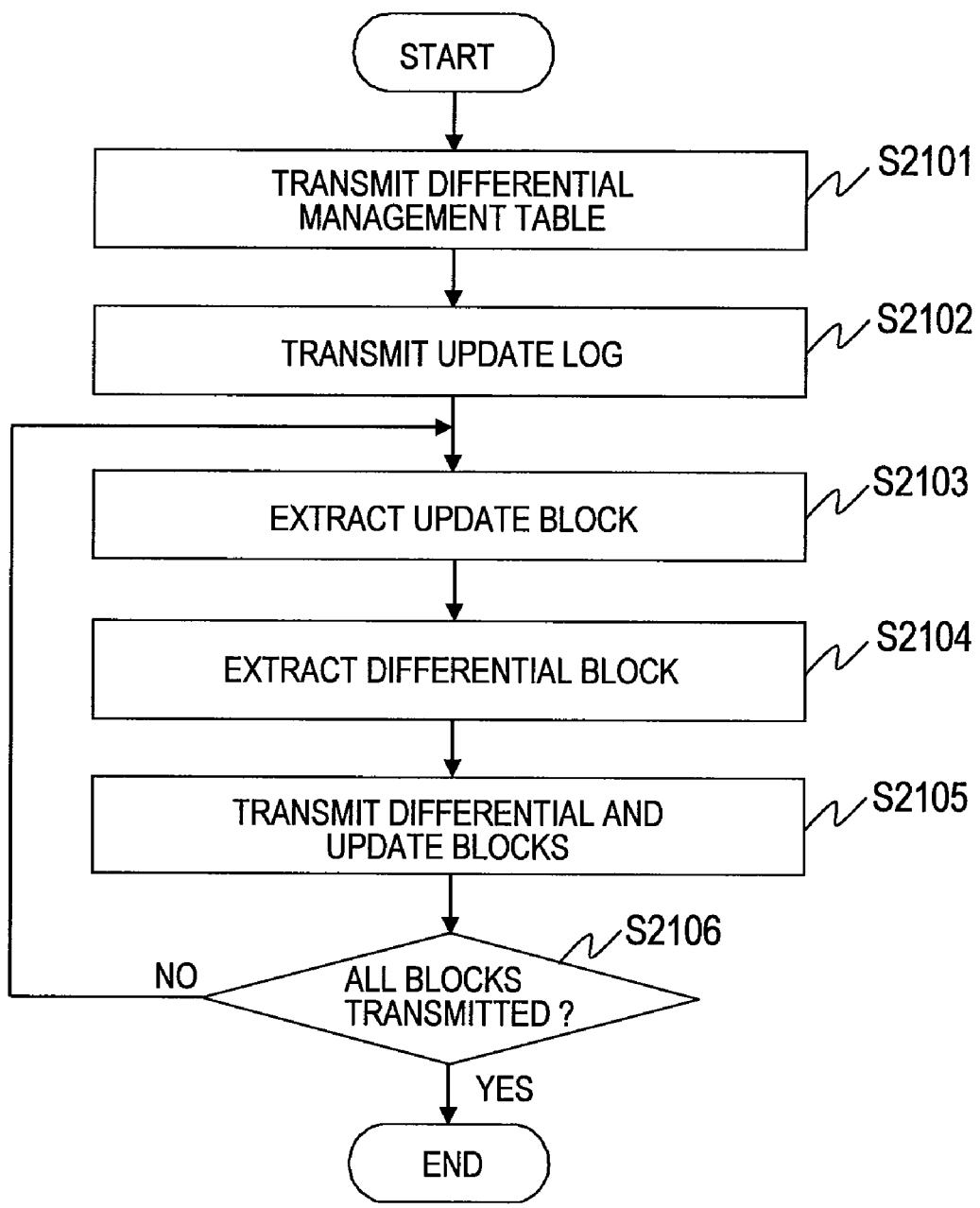
FIG. 20 is a flowchart for illustrating a process implemented by a remote copy processing program in a source NAS system according to the second embodiment of this invention.

FIG. 20 shows a process flow of a process implemented by the remote copy processing program 91 which is executed by the CPU 61 of the source NAS system 2a according to the second embodiment of this invention.

The CPU 61 of the source NAS system 2a executes the remote copy processing program 91, and first transmits, in S2101, all the entries of the differential management table 70 to the destination NAS system 2b. Next, in S2102, the CPU 61 transmits the update log 100 to the destination NAS system 2b.

Next, in S2103, the CPU 61 reads data stored in the blocks of the operational volume 8a corresponding to the update block Ids stored in the field 72 of the differential management table 70, and reads data, in S2104, stored in the blocks of the differential volume 9a corresponding to the differential block Ids stored in the field 73 of the differential management table 70.

Next, in S2105, the data of the update blocks and the data of the differential blocks which have been read out in S2103 and in S2104 are transmitted to the destination NAS system 2d through the communication control processing program 67 executed by the CPU 61. Next, in S2106, it is determined whether the update blocks and the differential blocks of all the entries stored in the differential management table 70 have been transmitted to the destination NAS system 2b. In the case where not all the entries have been transmitted, the process returns to S2103, where a next entry in the differential management table 70 is processed. In the case where it is determined in S2106 that all the entries of the differential management table 70 have been processed, the process is ended.

The above-mentioned processes may be executed in response to an instruction given by an administrator of the NAS system 2a or 2b from the NAS client 500, as in the first embodiment. Alternatively, the above-mentioned process may be executed at predetermined intervals.

Figure 21:
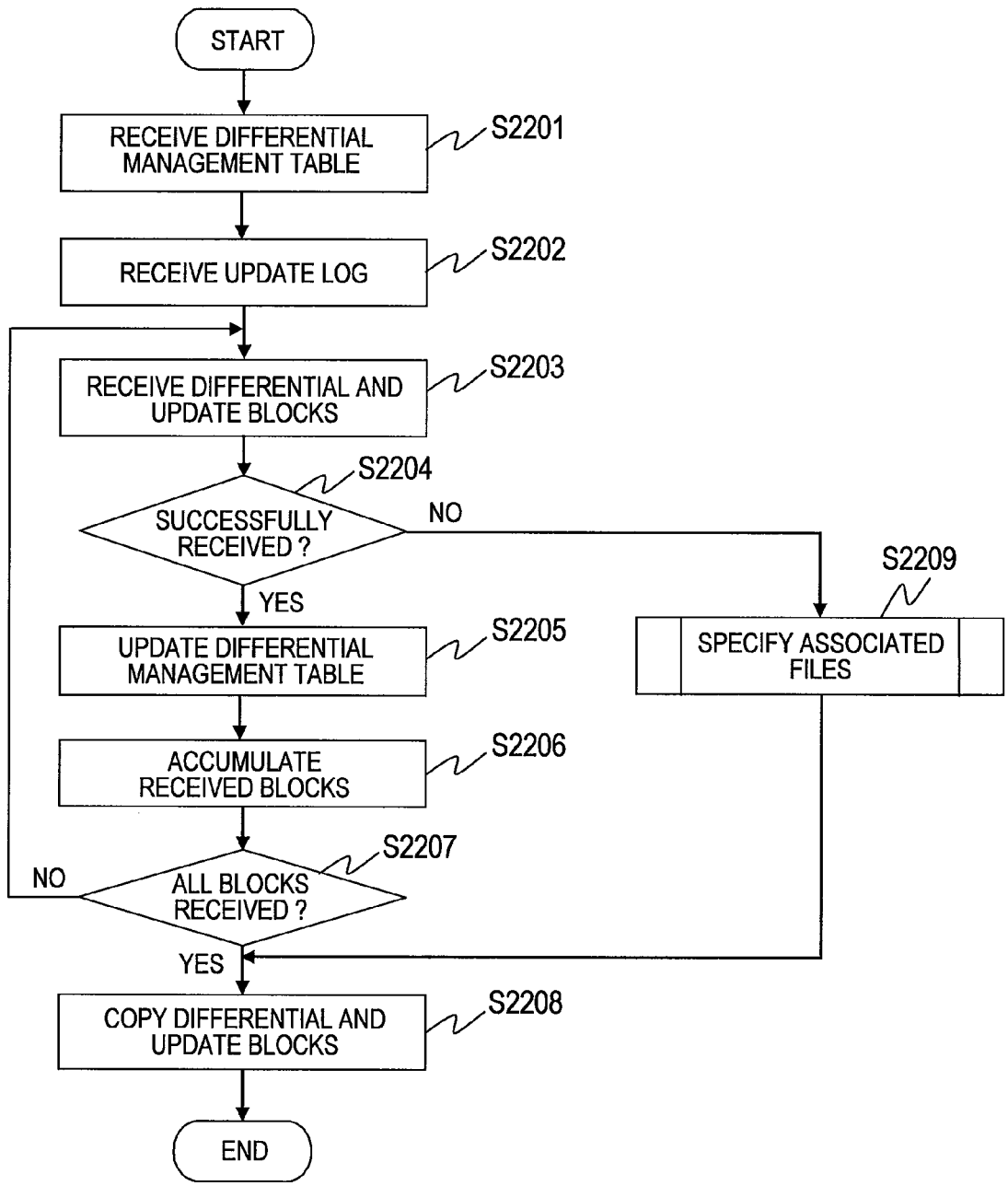
FIG. 21 is a flowchart for illustrating a process implemented by a remote copy processing program in a destination NAS system according to the second embodiment of this invention.

FIG. 21 shows a process flow of a process implemented by a remote copy processing program 91 which is executed by the CPU 61 of the destination NAS system 2b according to the second embodiment of this invention.

The CPU 61 of the destination NAS system 2b executes the remote copy processing program 91. In S2201, the CPU 61 first receives the differential management table 70 from the source NAS system 2a, and stores the differential management table 70 in the memory 65. Next, in S2202, the CPU 61 receives the update log 100 from the source NAS system 2a, and stores the update log 100 in the memory 65.

Next, in S2203, the CPU 61 receives update block and differential block transmitted from the source NAS system 2a. Then, in S2204, it is determined whether the update block and the differential block have been successfully received. The determination may be made in a manner similar to that in the first embodiment. In the case where it is determined, as a result of the determination in S2204, that the reception has failed, the process proceeds to S2209, where the process of specifying associated files is performed. The process to be performed in S2209 will be described later in detail.

In the case where it is determined, as a result of the determination in S2204, that the reception has succeeded, entries of the differential management table 70 corresponding to the received update block and the received differential block each have a value in the field 74 updated to "1" (S2205), and data of the update block and the differential block received in S2203 is accumulated on the memory 65 (S2206). Next, in S2207, it is determined whether all the entries in the differential management table 70 have a value in the field 74 set to "1", that is, data included in blocks corresponding to the update block Ids 72 and the differential block Ids 73 of all the entries stored in the differential management table 70 has all been received. In the case where there still remains entries having data of the update block Ids 72 and the differential block Ids 73 yet to be received, the process returns to S2203, where the data of the update block and the differential block transmitted next from the source NAS system 2a is received.

In the case where it is determined, as a result of the determination in S2207, that the data included in the blocks corresponding to the update block Ids 72 and the differential block Ids 73 of all the entries of the differential management table 70 has been received, the process proceeds to S2208, while in the case where the reception of data has not been completed, the process returns to S2203.

In S2208, update data and differential data of files each having a value set to "1" in the field 74 of completion flag of the differential management table 70, that is, update data and differential data of files from which all the update blocks and all the differential blocks have been completely received, are stored in the corresponding blocks in the operational volume 8b and the differential volume 9b, and the process is ended.

Next, with reference to FIG. 22, the process of S2209 of FIG. 21 will be described in detail.

Figure 22:
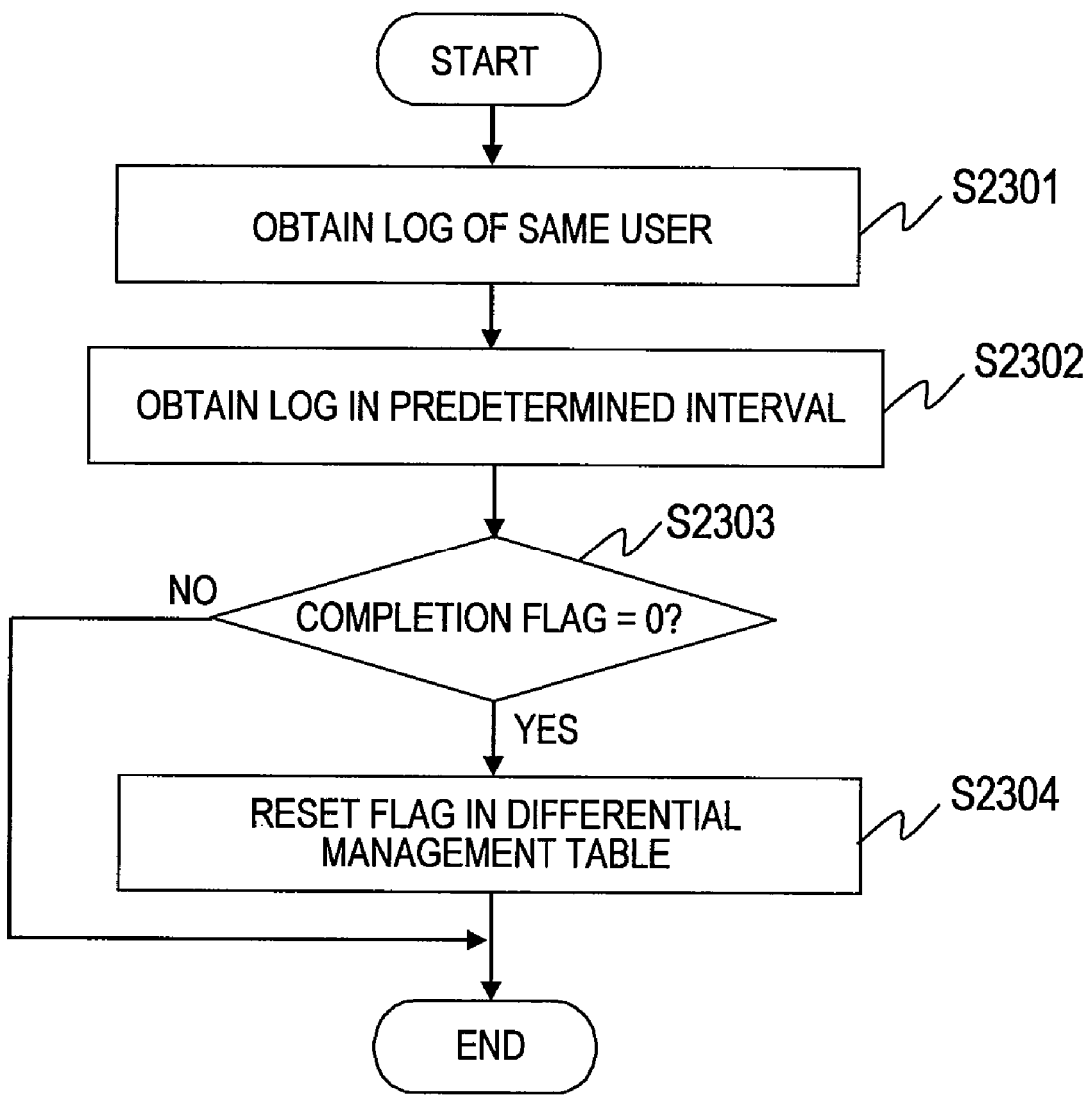
FIG. 22 is a flowchart for illustrating an example of a process of specifying an associated file, the process being implemented by the remote copy processing program of the destination NAS system according to the second embodiment of this invention.

FIG. 22 shows a process flow of a process of specifying associated files, the process being implemented by the remote copy processing program 91 which is executed by the CPU 61 of the destination NAS system 2b according to the second embodiment.

The CPU 61 executes the remote copy processing program 91, and categorizes, in S2301, entries of the update log 100 according to the value in the field 103, that is, on the basis of user who has updated the file (identifier of the NAS client 500). Then, in S2302, the CPU 61 further categorizes the entries which have been categorized on the basis of user in S2301, based on the value in the field 102 of each of the entries included in the update log 100. Specifically, the entries which have been input within a predetermined update interval are categorized as associated files. In other words, instead of creating the file update table 50 of the first embodiment, file management information for specifying associated files on the update log 100 is created.

Next, in S2303, entries of the differential management table 70 corresponding to all the files categorized in S2302 are referred to, and it is determined whether there is an entry having a value "0" for the completion flag in the field 74. In the case where there is no corresponding entry, the process is ended. In the case where it is determined, as a result of the determination in S2303, that there is a corresponding entry, entries of the differential management table 70 corresponding to all the files categorized in S2302 are referred to, and the values of the completion flags of the field 74 of those entries are set to "0". In other words, when a block for storing associated files of the target file to be updated has not received yet, the associated files and the target file to be updated can be excluded from the targets to be updated. After that, in S2208, only the files each having a value for the completion flag in the field 74 of the differential management table 70 set to "1" are updated.

As described above, according to the second embodiment of the data recovery method in the differential remote backup for the NAS system of this invention, in conducting remote copy between the NAS systems by using differential snapshots, blocks in the operational volume storing update data and blocks in the differential volume storing differential data are associated with updated files, and an execution status of the remote copy is recorded, for each block, in the differential management table 70 of the destination NAS system 2b. When the remote copy has failed due to a failure in the source NAS system 2a, data of files having the update data and the differential data all transferred to the destination NAS system 2b are stored in the operational volume 8a and the differential volume 9b of the destination NAS system 2b. Accordingly, the files which have already remote-copied at a point in time when the remote copy has failed do not return to a state before remote copy, to thereby prevent a situation where the files are brought back to a state before remote-copying when the destination NAS system has resumed operation.

As described above, according to the first and second embodiments of this invention, in conducting remote copy of update data in the operational volume 8a and the differential volume 9a, as an update block and a differential block, from the source NAS system 2a to the destination NAS system 2b, the differential management table 70 for indicating locations of the blocks forming the updated files is transmitted, prior to the transfer of the blocks, from the source NAS system 2a to the destination NAS system 2b. In this manner, in the case where the reception of the update block or the differential block has failed in the destination NAS system 2b due to a failure which has occurred in the source NAS system 2a, it is ensured that files each having the blocks forming the file all received by the destination NAS system 2b, are available as latest files by applying the update blocks and the differential blocks. Accordingly, this invention can be applied to a NAS system in which remote copy is conducted on a block basis, to thereby make it possible to ensure the consistency of data on a file basis when the remote copy has failed.

Further, files to be recovered simultaneously when the remote copy fails are extracted as associated files based on the update interval of the file and a user (NAS client 500) who has instructed the update, to thereby prevent a situation where a plurality of files to be used by the user are brought back in part to a state before update when data is restored in the destination NAS system 2b.

While the present invention has been described in detail and pictorially in the accompanying drawings, the present invention is not limited to such detail but covers various obvious modifications and equivalent arrangements, which fall within the purview of the appended claims.

What is claimed is:

1. A data recovery method in differential remote backup for a NAS system, which is used in a system including: a first NAS system for providing a first operational volume which includes files to be accessed through a network; a second NAS system for providing a second operational volume which stores a replication of the first operational volume through the network; and a management computer for managing the first NAS system and the second NAS system, the data recovery method being used for recovering the second operational volume in the second NAS system when a failure has occurred in the first NAS system, the first NAS system comprising: a processor for performing computing processing; a first memory for storing information; a first differential volume for storing differential data between snapshots of the first operational volume; a first differential management processing module for managing the differential data; a first transfer processing module for transferring data to the second NAS system; and differential management information for managing a correspondence between identification information for identifying blocks in the first operational volume, the blocks each storing update data of updated files of the files stored in the first operational volume, and identification information for identifying blocks in the first differential volume storing differential data of the updated files, the second NAS system comprising: a processor for performing computing processing; a second memory for storing information; a second differential volume for storing differential data between snapshots of the second operational volume; a second differential management processing module for managing the differential data; and a second transfer processing module for receiving data transferred from the first transfer processing module, the management computer comprising: a processor for performing computing operation; a third memory for storing information; a third transfer processing module for communicating with the second NAS system; and a determination processing module for determining whether or not to store the update data and the differential data in the second operational volume and in the second differential volume, respectively, the data recovery method comprising the steps of:

transmitting, by the first transfer processing module, the differential management information to the second transfer processing module;

sequentially transmitting, by the first transfer processing module, after the transmission of the differential management information, the update data of the first operational volume and the differential data stored in the first differential volume to the second transfer processing module;

storing, by the second transfer processing module, the differential management information received from the first transfer processing module, in the second memory;

receiving the update data and the differential data from the first transfer processing module and recording, in the differential management information stored in the second memory, completion of reception of the update data and the differential data, by the second transfer processing module;

transmitting, by the second transfer processing module, a reception failure notification to the third transfer processing module when the update data of the differential management information stored in the second memory has not all been received;

obtaining, by the third transfer processing module, upon receiving the reception failure notification from the second transfer processing module, the differential management information from the second memory of the second NAS system;

storing, by the third transfer processing module, the received differential management information in the third memory;

specifying, by the determination processing module, a file from which all the update data and all the differential data have been received, with reference to the differential management information stored in the third memory;

transmitting, by the third transfer processing module, an update instruction of the specified file to the second transfer processing module; and receiving the update instruction and storing update data of the file designated by the update instruction in the second operational volume, by the second transfer processing module.

2. The data recovery method in differential remote backup for a NAS system according to claim 1, wherein the step of storing the update data of the designated file in the second operational volume includes receiving the update instruction and storing the update data and the differential data of the file designated by the update instruction in the second operational volume and in the second differential volume, respectively, by the second transfer processing module.

3. The data recovery method in differential remote backup for a NAS system according to claim 2, wherein:

the management computer comprises file management information for managing files which need to be updated simultaneously, as associated files; and the determination processing module refers to the differential management information stored in the third memory, specifies a file from which all the update data and all the differential data of the associated files managed by the file management information have been received, as a target file to be updated; and the third transfer processing module transmits the update instruction, with respect to the specified file, to the second transfer processing module.

4. The data recovery method in differential remote backup for a NAS system according to claim 3, wherein:

the first NAS system comprises update log information recording a correspondence relation between an update date and time of a file and a client computer which has requested an update operation of the file;

the first differential management processing module records, when the update operation of a file is performed, a name of the file, the update date and time of the file, and an identifier of a client computer which has executed the update operation of the file, in the update log information; and the management computer records, with reference to the update log information of the first NAS system, files which are updated within a predetermined period by the same client computer, as associated files which need to be updated simultaneously, in the file management information.

5. The data recovery method in differential remote backup for a NAS system according to claim 3, wherein the determination processing module excludes, with reference to the differential management information of the third memory, files which are included in the same block storing update data and differential data of another file from which the update data and the differential data have been received only in part, from the target files to be updated.

6. A data recovery method in differential remote backup for a NAS system, which is used in a system including: a first NAS system for providing a first operational volume which includes files to be accessed through a network; and a second NAS system for providing a second operational volume which stores a replication of the first operational volume through the network, the data recovery method being used for recovering the second operational volume in the second NAS system when a failure has occurred in the first NAS system, the first NAS system comprising: a processor for performing computing processing; a first memory for storing information; a first differential volume for storing differential data between snapshots of the first operational volume; a first differential management processing module for managing the differential data; a first transfer processing module for transferring data to the second NAS system; and differential management information for managing a correspondence between identification information for identifying blocks in the first operational volume, the blocks each storing update data of updated files of the files stored in the first operational volume, and identification information for identifying blocks in the first differential volume storing differential data of the updated files, the second NAS system comprising: a processor for performing computing processing; a second memory for storing information; a second differential volume for storing differential data between snapshots of the second operational volume; a second differential management processing module for managing the differential data; a second transfer processing module for receiving data transferred from the first transfer processing module; and a determination processing module for determining whether or not to store the update data and the differential data in the second operational volume and in the second differential volume, respectively, the data recovery method comprising the steps of:

transmitting, by the first transfer processing module, the differential management information to the second transfer processing module;

sequentially transmitting, by the first transfer processing module, after the transmission of the differential management information, the update data of the first operational volume and the differential data stored in the first differential volume to the second transfer processing module;

storing, by the second transfer processing module, the differential management information received from the first transfer processing module, in the second memory;

receiving the update data and the differential data from the first transfer processing module and recording, in the differential management information stored in the second memory, completion of reception of the update data and the differential data, by the second transfer processing module;

specifying, by the determination processing module, a file from which all the update data and all the differential data have been received, with reference to the differential management information stored in the second memory, when the update data of the differential management information stored in the second memory has not all been received by the second transfer processing module; and storing, by the second transfer processing module, update data of the specified file in the second operational volume.

7. The data recovery method in differential remote backup for a NAS system according to claim 6, wherein the step of storing the update data of the specified file in the second operational volume includes storing, by the second transfer processing module, the update data and the differential data of the specified file in the second operational volume and in the second differential volume, respectively.

8. The data recovery method in differential remote backup for a NAS system according to claim 7, wherein:

the second NAS system creates file management information for managing files which need to be updated simultaneously, as associated files;

the determination processing module specifies, with reference to the differential management information, files from which all the update data and all the differential data of the associated files managed by the file management information have been received, as target files to be updated; and the second transfer processing module stores the update data and the differential data corresponding to the specified files, in the second operational volume and the second differential volume, respectively.

9. The data recovery method in differential remote backup for a NAS system according to claim 8, wherein:

the first NAS system comprises update log information recording a correspondence relation between an update date and time of a file and a client computer which has requested an update operation of the file;

the first differential management processing module records, when the update operation of a file is performed, a name of the file, the update date and time of the file, and an identifier of a client computer which has executed the update operation of the file, in the update log information; and the second NAS system records, with reference to the update log information of the first NAS system, files which are updated within a predetermined period by the same client computer, as associated files which need to be updated simultaneously, in the file management information.

10. The data recovery method in differential remote backup for a NAS system according to claim 8, wherein the determination processing module excludes, with reference to the differential management information of the second memory, files which are included in the same block storing update data and differential data of another file from which the update data and the differential data have been received only in part, from the target files to be updated.

11. A computer system comprising:

a first NAS system for providing a first operational volume which includes files to be accessed through a network; and a second NAS system for providing a second operational volume which stores a replication of the first operational volume through the network, wherein:

the first NAS system comprises: a processor for performing computing processing; a first memory for storing information; a first differential volume for storing differential data between snapshots of the first operational volume; a first differential management processing module for managing the differential data; a first transfer processing module for transferring data to the second NAS system; and differential management information for managing a correspondence between identification information for identifying blocks in the first operational volume, the blocks each storing update data of updated files of the files stored in the first operational volume, and identification information for identifying blocks in the first differential volume storing differential data of the updated files;

the second NAS system comprises: a processor for performing computing processing; a second memory for storing information; a second differential volume for storing differential data between snapshots of the second operational volume; a second differential management processing module for managing the differential data; a second transfer processing module for receiving data transferred from the first transfer processing module; and a determination processing module for determining whether or not to store the update data and the differential data in the second operational volume and in the second differential volume, respectively;

the first transfer processing module transmits the differential management information to the second transfer processing module, and sequentially transmits, after the transmission of the differential management information, the update data of the first operational volume and the differential data stored in the first differential volume to the second transfer processing module;

the second transfer processing module stores the differential management information received from the first transfer processing module in the second memory, and then receives the update data and the differential data from the first transfer processing module and records, in the differential management information stored in the second memory, completion of reception of the update data and the differential data; and the second transfer processing module specifies a file from which all the update data and all the differential data have been received, with reference to the differential management information stored in the second memory when the update data of the differential management information stored in the second memory has not all been received, and stores update data of the specified file in the second operational volume.

12. The computer system according to claim 11, wherein the second transfer processing module stores the update data and the differential data of the specified files in the second operational volume and the second differential volume, respectively.

13. The computer system according to claim 12, wherein:
the second NAS system creates file management information for managing files which need to be updated simultaneously, as associated files;

the determination processing module specifies, with reference to the differential management information of the second memory, files from which all the update data and all the differential data of the associated files managed by the file management information have been received, as target files to be updated; and the second transfer processing module stores the update data and the differential data corresponding to the specified files, in the second operational volume and the second differential volume, respectively.

14. The computer system according to claim 13, wherein:
the first NAS system comprises update log information recording a correspondence relation between an update date and time of a file and a client computer which has requested an update operation of the file;

the first differential management processing module records, when the update operation of a file is performed, a name of the file, the update date and time of the file, and an identifier of a client computer which has executed the update operation of the file, in the update log information; and the second NAS system records, with reference to the update log information of the first NAS system, files which are updated within a predetermined period by the same client computer, as associated files which need to be updated simultaneously, in the file management information.

15. The computer system according to claim 13, wherein the determination processing module excludes, with reference to the differential management information of the second memory, files which are included in the same block storing update data and differential data of another file from which the update data and the differential data have been received only in part, from the target files to be updated.

* * * * *